(12) United States Patent
Gajbhiye et al.

(10) Patent No.: US 11,827,858 B2
(45) Date of Patent: Nov. 28, 2023

(54) METHOD FOR OPTIMIZING GAS OIL SEPARATION PLANT PARAMETERS TO MAXIMIZE OIL RECOVERY

(71) Applicant: KING FAHD UNIVERSITY OF PETROLEUM AND MINERALS, Dhahran (SA)

(72) Inventors: Rahul Gajbhiye, Dhahran (SA); Ala Al-Dogail, Dhahran (SA); Badr Al-Dossary, Al-Khobar (SA); Mustafa Al-Naser, Al-Khobar (SA); Mohamed Mahmoud, Dhahran (SA)

(73) Assignees: KING FAHD UNIVERSITY OF PETROLEUM AND MINERALS, Dhahran (SA); Yokogawa Saudi Arabia Company, Al-Khobar (SA)

( * ) Notice: Subject to any disclaimer, the term of this patent is extended or adjusted under 35 U.S.C. 154(b) by 743 days.

(21) Appl. No.: 17/022,812

(22) Filed: Sep. 16, 2020

(65) Prior Publication Data

US 2022/0081622 A1    Mar. 17, 2022

(51) Int. Cl.
*C10G 7/12*    (2006.01)
*C10G 5/00*    (2006.01)
(Continued)

(52) U.S. Cl.
CPC ............... *C10G 7/12* (2013.01); *C10G 5/00* (2013.01); *G05B 13/027* (2013.01); *G05B 13/04* (2013.01);
(Continued)

(58) Field of Classification Search
CPC .... C10G 7/12; C10G 5/00; C10G 2300/4012; G05B 13/027; G05B 13/04; G06N 20/00;
(Continued)

(56) References Cited

U.S. PATENT DOCUMENTS 2,815,650 A    12/1957    Mcintire et al.
8,805,587 B1 *  8/2014    Elshafei .................. C10G 7/12
                                                                  700/266

OTHER PUBLICATIONS

M. Edwin, et al., Process Simulation and Optimization of Crude Oil Stabilization Scheme Using Aspen-HYSYS Software, International Journal of Recent Trends in Engineering & Research (IJRTER), vol. 3, Issue 5, May 2017, pp. 324-334 (Year: 2017).*
(Continued)

*Primary Examiner* — Rehana Perveen
*Assistant Examiner* — Troy A Maust
(74) *Attorney, Agent, or Firm* — Oblon, McClelland, Maier & Neustadt, L.L.P.

(57) ABSTRACT

Methods and systems for optimizing the gas-oil separation plant (GOSP) operating parameters in order to maximize the stabilized crude oil recovery in an integrated framework of GOSP operation. The ambient temperature variations daily (day and night) and seasonal (summer and winter) are incorporated to show their impact on liquid recovery. An artificial intelligence model predicts stabilized crude oil recovery for a range of ambient temperatures. The optimal GOSP separator pressures which yield maximum stabilized crude oil recovery are determined for each ambient temperature. The separator pressures of the GOSP may be adjusted to achieve the maximum stabilized crude oil recovery under changing ambient temperatures.

20 Claims, 19 Drawing Sheets

(51) Int. Cl.
   *G06N 20/00* (2019.01)
   *G09B 25/02* (2006.01)
   *G05B 13/02* (2006.01)
   *G05B 13/04* (2006.01)
   *G09B 9/00* (2006.01)

(52) U.S. Cl.
   CPC ............. *G06N 20/00* (2019.01); *G09B 9/00* (2013.01); *G09B 25/02* (2013.01); *C10G 2300/4012* (2013.01)

(58) Field of Classification Search
   CPC .......... G06N 3/048; G06N 3/08; G06N 20/10; G06N 3/126; G06N 3/0895; G06N 3/09; G06N 3/091; G06N 3/092; G06N 3/094; G06N 3/096; G06N 3/098; G06N 3/0985; G09B 9/00; G09B 25/02
   See application file for complete search history.

(56) References Cited

OTHER PUBLICATIONS

Anders Andreasen, "Applied Process Simulation-Driven Oil and Gas Separation Plant Optimization Using Surrogate Modeling and Evolutionary Algorithms", Chemengineering, vol. 4, No. 11, 2020, pp. 1-21.
Talal Al-Zahrani, et al., "Maximizing Crude Yield of Surface Production Facilities/GOSPs by Process Optimization", International Petroleum Technology Conference (IPTC), Document ID: IPTC-19586-MS, Jan. 13-15, 2020, 13 pages.
"OmegaLand", Omega Simulation Co., Ltd., https://www.omegasim.co.jp/contents_e/product/ol/, Jul. 27, 2020, 1 page (Abstract only).
Maurice I. Stewart, Jr., "Condensate Stabilization", Surface Production Operations, vol. 2, $3^{rd}$ Edition, 2014, 7 pages.
Fatai Anifowose, et al., "Recent advances in the application of computational intelligence techniques in oil and gas reservoir characterisation: a comparative study", Journal of Experimental & Theoretical Artifical Intelligence, vol. 26, No. 4, 2014, pp. 551-570.
M. Edwin, et al., "Process Simulation and Optimization of Crude Oil Stabilization Scheme Using Aspen-HYSYS Software", International Journal of Recent Trends in Engineering & Research (IJRTER), vol. 3, Issue 5, May 2017, pp. 324-334.
Øyvind Widerøe Kylling, "Optimizing separator pressure in a multistage crude oil production plant", Norwegian Univeristy of Science and Technology (NTNU), Jun. 2009, 77 pages.
Kegang Ling, et al., "New Method To Estimate Surface-Separator Optimum Operating Pressures", Oil and Gas Facilities, Jun. 2013, pp. 65-76.
Hosanna Uwitonze, et al., "Modelling and improving natural gas condensate process and stripping and heat integration", Chemical Engineering & Processing: Process Intensification, vol. 118, 2017, pp. 71-77.
Badr Al-Dossary, et al., "Decision Support System for Optimizing GOSP Operation", International Petroleum Technology Conference, IPTC-20021-Abstract, 2020, 10 pages.
Mohamed Mahmoud, et al., "Intelligent prediction of optimum separation parameters in the multistage crude oil production facilities", Journal of Petroleum Exploration and Production Technology, vol. 9, 2019, pp. 2979-2995.
Mohammed S. Al-Jawad, et al., "Correlating Optimum Stage Pressure for Sequential Separator Systems", SPE Projects, Facilities & Construction, Mar. 2020, pp. 13-16.
Reza Vaezi, et al., "Simulation and Optimization of H2S Expulsion from Crude Oil with the Use of Equilibrium Model", International Conference on Chemistry and Chemical Process (IPCBEE), vol. 10, 2011, pp. 101-106.
Kamarul A. Amminudin, et al., "Yield and Energy Optimization Initiatives at Saudi Aramco Khurais Central Processing Facility", SPE International Petroleum Exhibition & Conference, SPE 138526, Nov. 1-4, 2010, 5 pages.

* cited by examiner

| Ta | LPPT_P | LR |
|---|---|---|
| -1 | -1 | 0.545141676 |
| -1 | -0.96 | 0.583319802 |
| -1 | -0.92 | 0.622474748 |
| -1 | -0.88 | 0.659087466 |
| -1 | -0.84 | 0.692861735 |
| -1 | -0.8 | 0.725372151 |
| -1 | -0.76 | 0.754652896 |
| -1 | -0.72 | 0.783220893 |
| -1 | -0.68 | 0.809063477 |

Data

| 1 | 0.68 | -0.202474605 |
|---|---|---|
| 1 | 0.72 | -0.206311258 |
| 1 | 0.76 | -0.209444722 |
| 1 | 0.8 | -0.213732267 |
| 1 | 0.84 | -0.216088724 |
| 1 | 0.88 | -0.222737337 |
| 1 | 0.92 | -0.229136632 |
| 1 | 0.96 | -0.231741183 |
| 1 | 1 | -0.238081854 |

METHOD FOR OPTIMIZING GAS OIL SEPARATION PLANT PARAMETERS TO MAXIMIZE OIL RECOVERY

STATEMENT REGARDING PRIOR DISCLOSURE BY THE INVENTORS

Aspects of this technology were presented with title "Novel Approach to Optimize GOSP using Artificial Intelligence" at the APCChE 2019 conference in Sapporo, Japan on Sep. 25, 2019; with title "GOSP Optimization Using Artificial Intelligence" at the ISA Saudi Arabia Section Eastern Region Event 2019, on Oct. 20, 2019; and with title "Decision Support System for Optimizing GOSP Operation" at the International Petroleum Technology Conference, on Jan. 13, 2020, each of which are incorporated herein by reference in their entirety.

STATEMENT OF ACKNOWLEDGEMENT

The inventor(s) acknowledge the support provided by Yokogawa Saudi Arabia for funding and supporting this research under Project CIPR 2328 and the support of the King Fand University of Petroleum and Minerals College of Petroleum Engineering and Geoscience and the Deanship of Scientific Research.

BACKGROUND

Technical Field

The present disclosure is directed to a method for operating a gas-oil separation plant to enhance liquid recovery.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A Gas Oil Separation Plant (GOSP) is a key oil processing facility. A GOSP facility must be operated under optimum conditions in order to maximize the production. The current practice is to operate a GOSP according to parameters and under conditions determined at the design stage based on simple laboratory tests. Conventional methods do not account for environmental variations and reservoir conditions that affect operation parameters thus resulting in lower liquid recovery and profitability loss.

Crude oil extracted from oil fields passes through several operations before it can be exported to end users. Crude oil separation is one of the key processes to separate oil, gas and water. Thus, operation of a gas-oil separation plant (GOSP) under optimal conditions is considered highly desirable by oil operators. In order to improve plant operation including overall operation of the units, operating parameters of individual units and external disturbances a process must be used that considers all variables and their respective effects on operation. In actuality, for GOSP, implementing optimum parameters and establishing optimal control conditions for the all of the connected individual units is difficult to implement in a real, non-simulated operation.

In general, due to the underlying governing principles of different unit operations, the optimization of each individual unit has been found to be the simplest manner of improving the operation of a gas-oil separation plant (GOSP). Conventionally GOSP improvement has been performed by optimizing those units which work on a similar governing principle. Amongst such are the optimization of separator condition, size, and stages to maximize the quantity and quality of the oil. Performance parameters in relation to the reservoir such as oil API, formation volume factor ($B_o$) and gas-oil-ratio (GOR) have been included in the objective functions used for the optimizations. (See Mahmoud M. Tariq M. Kamal M., and Al-Naser M. "*Intelligent Prediction of Optimum Separation Parameters in the Multistage Crude Oil Production Facilities*" Journal of Petroleum Exploration and Production Technology, 2019, https://doi.org/10.1007/s13202-019-0698-6; Edwin M., Abdulsalam S. and Muhammad I., "*Process Simulation and Optimization of Crude Oil Stabilization Scheme Using Aspen-HYSYS Software*", International Journal of Recent Trends in Engineering & Research (IJRTER) Volume 03, Issue 05; May—2017 [ISSN: 2455-1457]; Elshafei M. and Doklah M., "Method for Optimizing and Controlling Pressure in Gas-Oil Separation Plants", U.S. Pat. No. 8,805,587, August 2014.; Muhammad F., "*Simulation of Crude Oil Stabilization*", B. Eng project, Chemical Engineering Department. Universiti Teknologi PETRONAS, Malaysia, 2013; Ling, K., Wu, X., Guo, B., and He, J. 2013. "*New Method to Estimate Surface-Separator Optimum Operating Pressures. Oil and Gas Facilities*", Journal 2 (3): 65-76. doi:10. 2118/163111-PA; and K. Amminudin, "*Yield and Energy Optimization Initiatives at Saudi Aramco Khurais Central Processing Facility*", SPE 138526, Abu Dhabi International Petroleum Exhibition & Conference held in Abu Dhabi, UAE, 1-4 Nov. 2010, each incorporated herein by reference in their entirety).

FIG. 1 shows a simplified process diagram of a typical GOSP. Crude oil (wet crude) extracted from an oil field or hydrocarbon reservoir is first processed at the gas-oil separation plant 100, where stabilized crude oil 110 is produced through a series of separation systems which include a high-pressure separator or High-Pressure Production Trap (HPPT) 112, a low-pressure separator or Low-Pressure Production Trap (LPPT) 116, and a stabilizer 102. The gas and condensate are collected in gas train 104, and processed as sour gas 106 and natural gas liquid (NGL) 108 for export. (See Amminudin K. and Muaibed M. "*Optimization Yields Gains for Saudi Crude Processing Giant*" Oil and gas Journal, December 2014, incorporated herein by reference in its entirety). Sour gas is natural gas or any other gas containing significant amounts of hydrogen sulfide ($H_2S$). Natural gas is usually considered sour if there are more than 5.7 milligrams of $H_2S$ per cubic meter of natural gas, which is equivalent to approximately 4 ppm by volume under standard temperature and pressure.

A GOSP plant must efficiently process the inlet feed stream (wet crude) so as to meet the specifications for oil and gas production, such as is driven by sales or production contracts, and goals for injection or disposal requirements of the water produced. Although the volume or outlet specifications are fixed, the inlet feed composition varies over time. Further, reservoir pressure and temperature changes with time affect the oil/water/gas ratio as well as the quality of the feed stream for the GOSP plant. These changes must be considered when operation GOSP at elevated capacity and efficiency. Generally, GOSP optimization is carried out based on the quantity and quality of the feed stream.

The gas-oil-ratio (GOR), formation volume factor ($B_o$) and oil density (API) have conventionally been considered as the performance parameters of the GOSP operation. The objective of GOSP optimization is to achieve minimum GOR and formation volume factor and maximum API. (See Arnold, K.; Stewart, M. "*Surface Production Operations (2nd Edition) Volume 1—Design of Oil-Handling Systems and Facilities*", Elsevier 1999, incorporated herein by reference in its entirety). However, the combined effect of these parameters is reflected by the liquid (oil) recovery. Therefore, maximum liquid recovery from GOSP plant will yield low GOR, low formation volume factor ($B_o$) and low oil density (high API). Hence, optimization should aim to maximize the liquid oil recovery.

During the gas-oil separation process, the conventional goal has been to liberate light components such as methane ($C_1$) and ethane ($C_2$) and form a separate gas stream while retaining heavier components in a liquid stream, thus the preferred gas-oil separation method is a differential liberation which retains a maximum amount of the heavy and intermediate components in the liquid stream. Gas liberated earlier at higher pressures is not present at lower pressures to co-evaporate or aerosol intermediate and heavy components. (See Clark, N., "*Elements of Petroleum Reservoirs*", Dallas: Society of Petroleum Engineers, 1960; Ahmed, T. H., "*Reservoir Engineering Handbook*", Elsevier Inc., 2006, each incorporated herein by reference in their entirety). However, implementation of differential liberation is costly and generally not feasible as a field operation.

An inlet feed stream (wet crude in FIG. 1) goes through a series of stage separation processes (HPPT 112, LPPT 116, stabilizer 102). The number of stages depends on the composition of the feed stream, pressure and temperature of the fluid stream and the operating conditions of each individual operation unit. Also, crude oil treatment requires other processes, such as heater-treater, desalination, and stabilization, to meet the demand requirements and to qualify for storage and transportation. Thus, liquid recovery from a GOSP depends on parameters such as the number of separation stages, the inlet feed composition and the pressure and temperature of the individual operation units in the GOSP plant.

These processes and parameters are governed by different physical principles although they are integrated to achieve the targeted specification. The performance of each individual unit relies on the other units and therefore processes integrated across a plurality of units are affected by the changes in operation of each individual unit. Different governing principles of the units working in an integrated network make GOSP optimization very complex and difficult to achieve as well as to implement in a field operation.

As noted earlier, improving unit operations of individual units has been conventionally considered as the simplest way of optimizing an integrated GOSP plant. Previous research has focused on determining the optimum operating conditions for the separation process. Al-Jawad and Hassan (2010) proposed an empirical approach to estimate operating pressure for the two-stage and three-stage separation process. (See Al-Jawad M. and Hassan O., "*Correlating optimum stage pressure for sequential separator systems*", SPE Projects, Facilities & Construction 5(1):13-16, 2010. https://doi.org/10.2118/118225-PA, incorporated herein by reference in its entirety). Also, Ling et al. (2013) provided an approximation to determine the optimum separator pressure based on the wellhead pressure. (See Ling K., Wu X., Guo B., and He J., "*New method to estimate surface-separator optimum operating pressures*", Oil Gas Facility 2(3):65-76, 2013, incorporated herein by reference in its entirety). Methods to determine the optimum separator conditions based on flash equilibrium during the summer and winter and a simulation study for optimizing the separation conditions have been published, as well as an artificial intelligence approach for estimating number of stages and the operating pressure and temperature conditions in a multi-stage separation process, (See Kylling O., "*Optimizing separator pressure in a multistage crude oil production plant*" MS Thesis, Norwegian University of Technology, 2009; Mahmoud M. Tariq M. Kamal M., and Al-Naser M. "*Intelligent Prediction of Optimum Separation Parameters in the Multistage Crude Oil Production Facilities*" Journal of Petroleum Exploration and Production Technology, 2019, https://doi.org/10.1007/s13202-019-0698-6, each incorporated herein by reference in their entirety). However, these publications focused on the separation unit and neglect other processes, such as stabilization, for which efficiency improvements are essential for meeting the crude oil specifications for storage and transportation.

Other research has been directed towards the stabilization process of the crude oil. For example, simulations for optimizing the stabilization plant, crude oil stabilization and condensate stabilization have been developed for optimizing the operating conditions. (See Edwin M., Abdulsalam S. and Muhammad I., "*Process Simulation and Optimization of Crude Oil Stabilization Scheme Using Aspen-HYSYS Software*", International Journal of Recent Trends in Engineering & Research (IJRTER) Volume 03, Issue 05; May—2017 [ISSN: 2455-1457]; Muhammad F., "*Simulation of Crude Oil Stabilization*", B. Eng project, Chemical Engineering Department. Universiti Teknologi PETRONAS, Malaysia, 2013; Rahmanian, N., Bin I., and Nasrifar, K., "*Process Simulation and Assessment of a Back-up Condensate Stabilization Unit*", Journal of Natural Gas Science and Engineering, Vol. 26, Issue Pp. 730-736, 2015, incorporated herein by reference in its entirety).

However, a methodology or strategy for improving unit operations in an integrated GOSP across all components of a complete oil train has not previously been developed. Although, the optimization of individual components of the GOSP unit was achieved, it is difficult to implement in the field as all the components are connected to each other and establishing the optimum control condition for the individual unit is difficult to implement.

Accordingly, it is one object of the present disclosure to provide methods and systems for improving output, efficiency, throughput and stability of a GOSP process and system which applies an integrated approach and includes unit operations of the stabilizer to identify operating pressures which yield maximum liquid recovery for each ambient temperature. The relationships between the optimum pressure and ambient temperature variations between summer and winter are determined in order to achieve maximum product recovery.

SUMMARY

In an exemplary embodiment, a method for maximizing stabilized crude oil recovery in a gas-oil separation plant (GOSP) is described, comprising building, by a computing unit including a dynamic simulator, a process model of the gas-oil separation plant, wherein the model includes at least a plurality of separators, a stabilizer and a storage tank of the GOSP; simulating the stabilized crude oil recovery of the GOSP under varying operating pressures of at least one separator of a plurality of separators for different ambient temperatures surrounding the stabilizer to generate a simulated stabilized crude oil recovery dataset; normalizing, by the computing unit, the simulated stabilized crude oil recovery dataset to generate a normalized stabilized crude oil recovery dataset; training, by the computing unit, an artificial intelligence unit with a first portion of the normalized stabilized crude oil recovery dataset to generate a trained artificial intelligence model; inputting to the trained artificial intelligence model a second portion of the normalized stabilized crude oil recovery dataset; predicting, by the computing unit, the stabilized crude oil recovery for each separator pressure at each ambient temperature; determining, by the computing unit, a pressure which maximizes stabilized crude oil recovery for each ambient temperature; and adjusting, by the computing unit, the operating pressures of the plurality of separators of the GOSP to compensate for ambient temperature conditions.

In another exemplary embodiment, a system for maximizing stabilized crude oil recovery is described, comprising a gas-oil separation plant (GOSP) having components including: a plurality of separators, a stabilizer, a storage tank configured for holding stabilized crude oil and a computing unit operatively connected to the components, the computing unit including a computer-readable medium comprising program instructions, executable by processing circuitry, to cause the processing circuitry to: use a dynamic simulator to build a process model of the gas-oil separation plant, wherein the model includes at least the plurality of separators, the stabilizer and the storage tank; simulate the stabilized crude oil recovery of the GOSP under varying operating pressures of at least one separator of a plurality of separators for different ambient temperatures surrounding the stabilizer to generate a simulated stabilized crude oil recovery dataset; normalize, by a normalization unit of the computing unit, the simulated stabilized crude oil recovery dataset to generate a normalized stabilized crude oil recovery dataset; train, by the computing unit, an artificial intelligence unit with a first portion of the normalized stabilized crude oil recovery dataset to generate a trained artificial intelligence model; input to the trained artificial intelligence model a second portion of the normalized stabilized crude oil recovery dataset; predict the crude oil recovery for each separator pressure at each ambient temperature; determine, by an optimization unit of the computing unit, the pressure which yields maximum stabilized crude oil recovery for each ambient temperature; and adjust, by the computing unit, the operating pressures of the plurality of separators of the GOSP to compensate for ambient temperature conditions.

In another exemplary embodiment, a non-transitory computer readable medium having instructions stored therein that, when executed by one or more processor, cause the one or more processors to perform a method for maximizing stabilized crude oil recovery in a gas-oil separation plant (GOSP) is described, comprising building, by a computing unit including a dynamic simulator, a process model of the gas-oil separation plant, wherein the model includes at least a plurality of separators, a stabilizer and a storage tank of the GOSP; simulating the stabilized crude oil recovery of the GOSP under varying operating pressures of at least one separator of a plurality of separators for different ambient temperatures surrounding the stabilizer to generate a simulated stabilized crude oil recovery dataset; normalizing, by the computing unit, the simulated stabilized crude oil recovery dataset to generate a normalized stabilized crude oil recovery dataset; training, by the computing unit, an artificial intelligence unit with a first portion of the normalized stabilized crude oil recovery dataset to generate a trained artificial intelligence model; inputting to the trained artificial intelligence model a second portion of the normalized stabilized crude oil recovery dataset; predicting, by the computing unit, the stabilized crude oil recovery for each separator pressure at each ambient temperature; determining, by the computing unit, a pressure which maximizes stabilized crude oil recovery for each ambient temperature; and adjusting, by the computing unit, the operating pressures of the plurality of separators of the GOSP to compensate for ambient temperature conditions.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
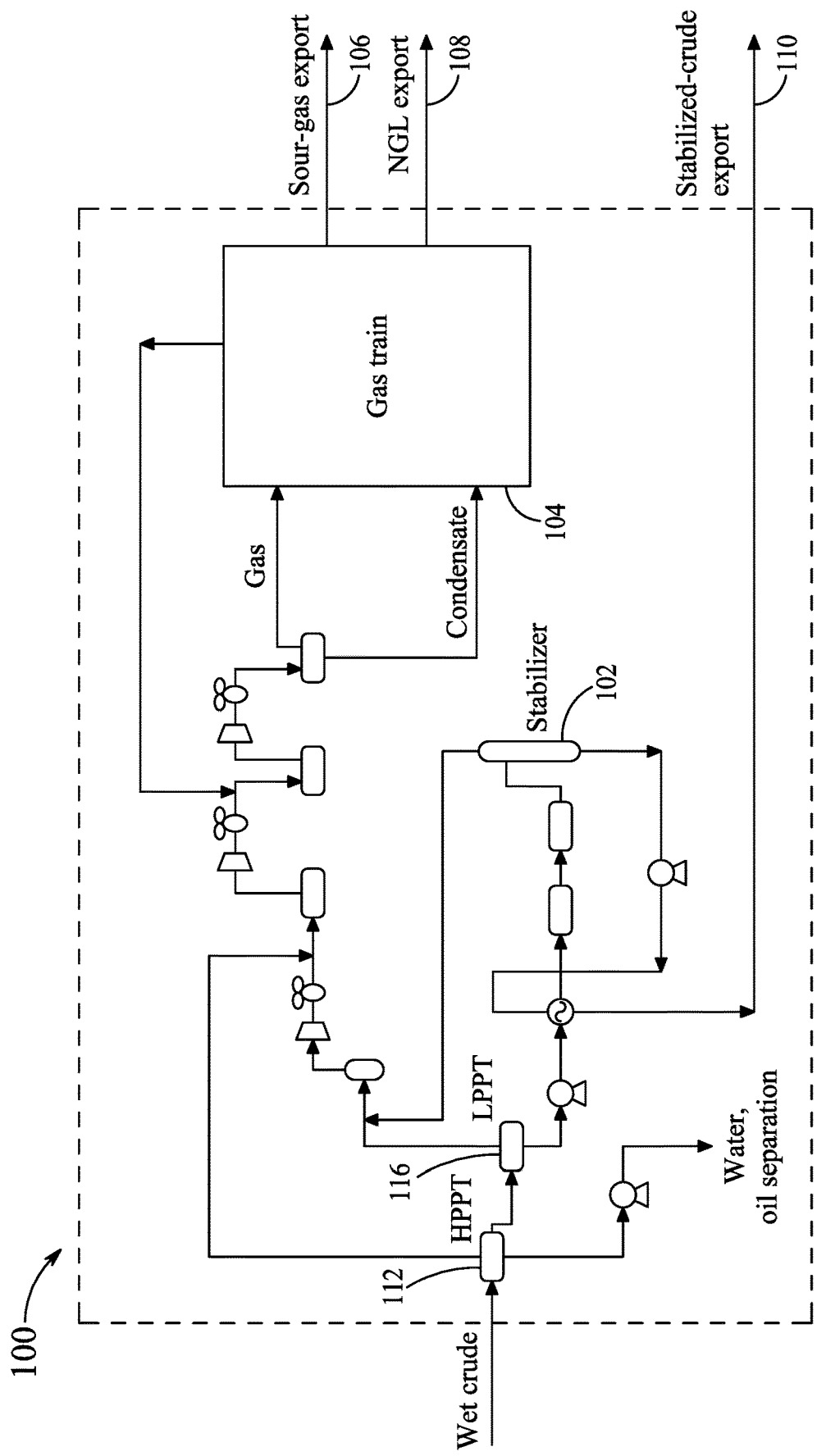
FIG. 1 is a diagram illustrating a typical gas-oil separation plant process.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method for maximizing stabilized crude oil recovery in a gas-oil separation plant (GOSP), system for maximizing stabilized crude oil recovery and a non-transitory computer readable medium having instructions stored therein that, when executed by one or more processors, cause the one or more processors to perform a method for maximizing stabilized crude oil recovery in a gas-oil separation plant.

The stabilization of crude oil is necessary to improve the efficiency of gas-oil separation processes. The goals of the stabilization include maximizing stock tank recovery while meeting vapor pressure and $H_2S$ specifications. Butanes increase vapor pressure of crude oil considerably since the true vapor pressure of $i-C_4$ and $n-C_4$ are 72.6 and 50.1 psi, respectively. Control of butane content controls the Reid Vapor Pressure (RVP) and True Vapor Pressure (TVP). One goal of stabilization is to remove $C_1$, $C_2$, and $C_3$ as completely as possible while leaving the maximum amounts of $C_4$, $C_5$ and heavier components in the crude oil.

The Reid Vapor Pressure (ASTM D323) is an ASTM test method which measures the vapor pressure of crude oil and petroleum refined products. Reid Vapor Pressure testing indirectly measures volatile petroleum solvent evaporation rates.

Most of the partial gas pressure of crude oil comes from low boiling compounds in particular low molecular weight hydrocarbons such as methane and ethane which might be present only in small quantities. The goal of stabilization is to remove these low boiling compounds without losing the more valuable higher molecular weight components.

As a part of the stabilization process, adjusting pentanes and lighter fractions retained in the stock tank liquid can change the crude oil API gravity. The API gravity is a measure of how heavy or light a petroleum liquid is compared to water: if its API gravity is greater than 10, it is lighter and floats on water; if less than 10, it is heavier and sinks. API gravity is thus an inverse measure of the density of a petroleum liquid relative to that of water (also known as specific gravity). It is used to compare densities of petroleum liquids. For example, if one petroleum liquid is less dense than another, it has a greater API gravity. Although API gravity is mathematically a dimensionless quantity, it is referred to as being in "degrees". API gravity is graduated in degrees on a hydrometer instrument. API gravity values of most petroleum liquids fall between 10 and 70 degrees, where 10 degrees is the same density as that of water.

The economic value of crude oil can be influenced by stabilization. First, liquids can be stored and transported to the market more profitably than gas. Second, it is safer to minimize gas losses from light crude oil when it is stored.

The ultimate goal of gas-oil separation plants (GOSP) is to maximize the liquid recovery, capture marketable gases and remove by-products, such as soot, hydrogen sulfide gases and other pollutants from an output air stream.

Liquid recovery depends on:
1) the number of separation stages;
2) the pressure during each separation stage;
3) daily and seasonal ambient temperature variations.

Improving cumulative separation of a GOSP plant is difficult to achieve with conventional methods that include separately optimizing each component and/or separation unit without regarding their interrelationships. It is essential to consider the complete GOSP plant rather than distinct units individually. In order to do so, the various parameters affecting the process must be considered, respective process sensitivities identified and quantified, and opportunities for process optimization must be identified.

Aspects of the present disclosure include the development of a generic integrated framework for maximizing oil (a mixture of heavier molecular weight hydrocarbons) recovery by adjusting the LPPT separator pressure in a gas-oil separation plant (GOSP).

Figure 2:
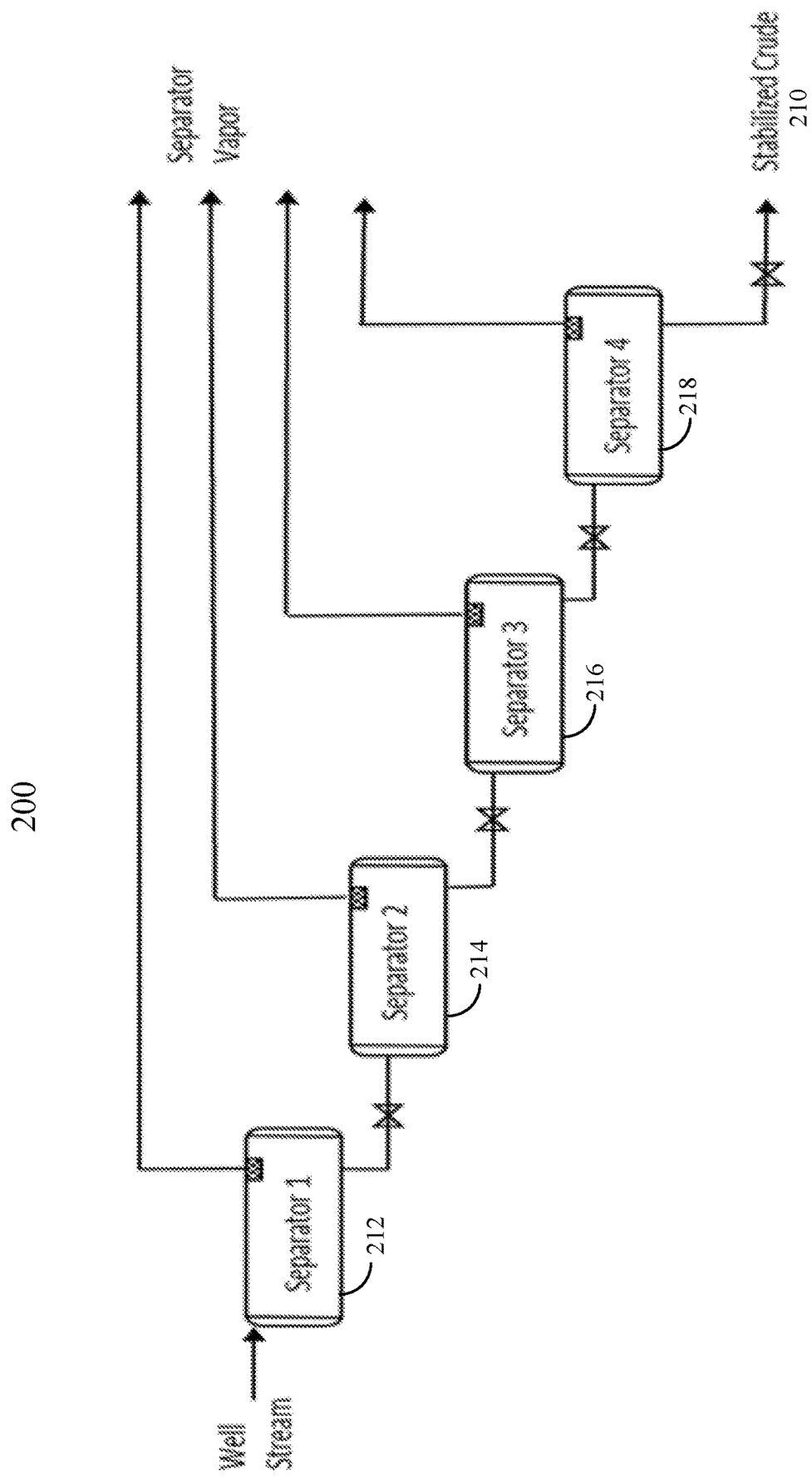
FIG. 2 is a diagram illustrating a basic multi-stage separation scheme.

Crude oil can be stabilized through a series of flash or vapor-liquid separators operating at successively lower pressures. Tray towers with reboilers and stripping gas may be used in combination with the separator. Multistage separation is the most commonly used method for oil stabilization. FIG. 2 shows a conventional multistage separation process for crude oil stabilization. The pressure at the last stage of the separation for the separator vapor is set at atmospheric pressure. Theoretically, the maximum yield of stabilized crude oil 210 is obtained by differential separation which corresponds to an infinite number of separation stages (e.g., 212, 214, 216, 218), however, more than three stages are rarely used in practice.

In many plants, the last stage of the separator (218, FIG. 2) is replaced by either a reboiler stabilizer column or stabilizer column with stripping gas. A reboiler produces a stabilized crude oil as heated vapor flows up a column, stripping out methane, ethane, propane, and butane. Stripping is defined as a physical separation process by which one or more components preferably having an average molecular weight lighter than the average molecular weight of the mixture undergoing stripping are removed from a liquid stream by a vapor stream. Additionally, a stripping gas lowers the water partial pressure of the liquid stream causing more water to vaporize from the liquid stream.

Figure 3:
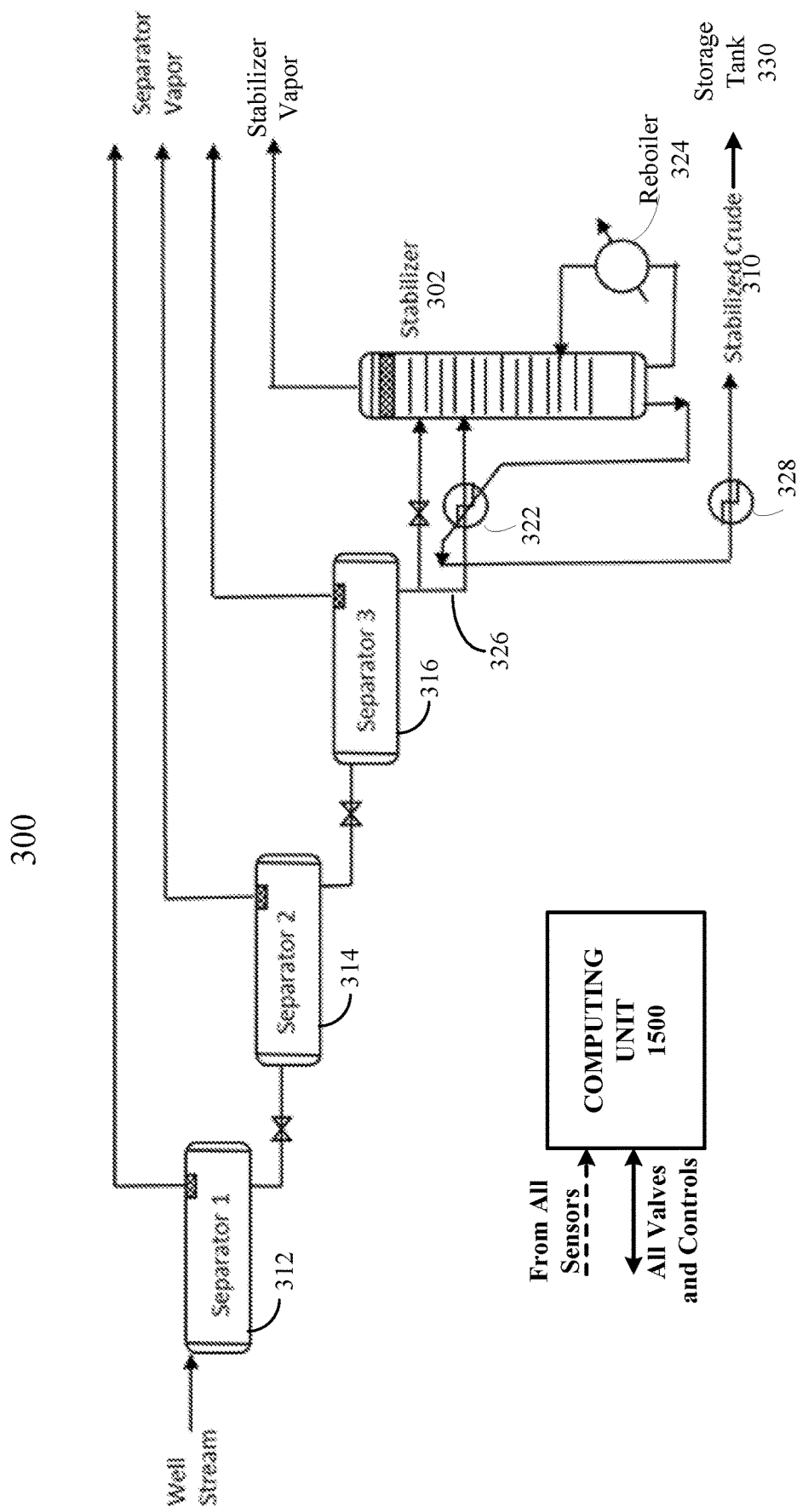
FIG. 3 is a diagram illustrating a stabilizer tower column with multi-stage separation.

FIG. 3 shows a schematic of a stabilizer column tower 302. The stabilizer column is equipped with a series of trays intended to perform vapor-liquid contacting/interaction. The liquid feed 326 from separator 316 is fed into the top of stabilizer column 302. As the liquid falls through the tower, the liquid falls from tray to tray (indicated by horizontal lines within the stabilizer 302), and becomes increasingly richer in the heavy components and increasingly leaner in the light components.

The stabilized liquid is cooled in a heat exchanger 322 by the feed stream 326 and cooled in heat exchanger 328 before flowing out to be collected in a storage container for export. The vapor produced by reboiler 324 at the bottom of the column, or by stripping gases such as methane, ethane and propane, flows in the column while butanes are retained in the stabilized crude oil 310. Liquid crude oil at the bottom of the column may be heated by the reboiler 324 and pumped to a higher level tray to further separate and subsequently condense light components. The crude oil expelled from the bottom of the stabilizer 302 is cooled (322, 328) before being output as stabilized crude oil 310. Separation obtained by the stabilizer tower 302 is much more effective than the single stage separation of separators 312, 314 and 316. A greater amount of crude oil is produced using a stabilization column as the high operating pressure of the column yields more crude oil. Several different configurations can be applied, such as the multi-flash stabilization or the use of a stabilization column with feed-reflux or refluxed by a dedicated chilling unit.

At the top of the tower any intermediate components going out with the gas may be condensed, separated, pumped back to the tower, and sprayed down on the top tray or onto one or more lower trays. This liquid is called "reflux". In a feed-refluxed stabilizer column, a percentage of the heated liquid at the bottom of the column is cooled and fed back to the top of the column (not shown).

In one aspect of the present disclosure a computing unit 1500 is connected to sensors at each input and output of the separators (312, 314, 316), stabilizer 302, heat exchangers (322, 328), to each valve (shown by valve circuit symbols) and to liquid level sensors (not shown) in the stock tank 330. The computing unit 1500 may be configured to receive data from the sensors, carry out an optimization by the methods of the present disclosure, and adjust the pressures of the separators and stabilizer, adjust the valves, the heat and pressure of the reboiler 324, and the like. The sensors may be any of pressure, temperature, flow rate, $O_2$, $H_2S$, liquid level sensors, and such like, as needed to define the operating parameters of a GOSP plant.

The liquid hydrocarbon (condensate) is brought into the system from the inlet separators and preheated in the stabilizer feed/bottoms exchanger, before entering a stabilizer feed drum. Liquid from the feed drum is fed to the stabilization tower at approximately 50 to 200 psi, depending on whether it is sour (sour stabilization is carried out at the low end of the range and sweet stabilization at the high end of the range). The condensate stabilizer reduces vapor pressure of the condensate by removing the lighter components. The stabilization is typically carried out in a reboiled absorber, with tray-type internals (See U.S. Pat. No. 2,815,650). At the bottom of the tower, some of the liquid is circulated through a reboiler to add heat to the tower. The liquids leaving the bottom of the tower have undergone a series of stage flashes at ever increasing temperatures, driving off the light components. These liquids therefore must be cooled to a sufficiently low temperature to keep vapors from flashing to atmosphere in the condensate storage tank. (See Mokhatab, S.; Poe, W., "Handbook of Natural Gas Transmission and Processing", 2012, incorporated herein by reference in its entirety).

Feed crude oil pressure may be as high as 1,000 psi and must be reduced considerably before it reaches the stabilizer 302 and the stock tank 330. Changes in temperature affect the production of crude oil. For example, there are eleven GOSPs in the Abqaiq area of Saudi Arabia. Abqaiq is one of the largest production plants having a crude-oil stabilizer. It can process up to 950,000 barrels of crude daily. Practically, however, the Abqaiq stabilizer can process 950,000 barrels of crude oil in summer, but only about 860,000 in winter. These variations in process capacity are due to the changes in ambient temperature. Due to seasonal changes, the stabilization system/process design must be flexible enough to meet requirements under various operating conditions. During winter, a higher concentration of $C_3$, $C_4$, and $C_5$ may be present in the oil. Therefore, the temperature set-point for the stabilizer should be relatively low to increase oil production during the winter months. In the summer, the stabilizer may be operated at a higher temperature. Ambient conditions must be considered for efficient stabilization. (See Uwitonze, H., Hwang, K., Lee, I., "*Modelling and Improving Natural Gas Condensate Process with Stripping and Heat Integration*", Chemical Engineering and Processing: Process Intensification, Volume 118, 2017; and Reza, V., Hossein, A. and Farshad, F. T., "*Simulation and Optimization of H2S Expulsion from Crude Oil with the Use of Equilibrium Mode*", International Conference on Chemistry and Chemical Process, Issue 10, 101-106, 2011, each incorporated herein by reference in their entirety).

Figure 4:
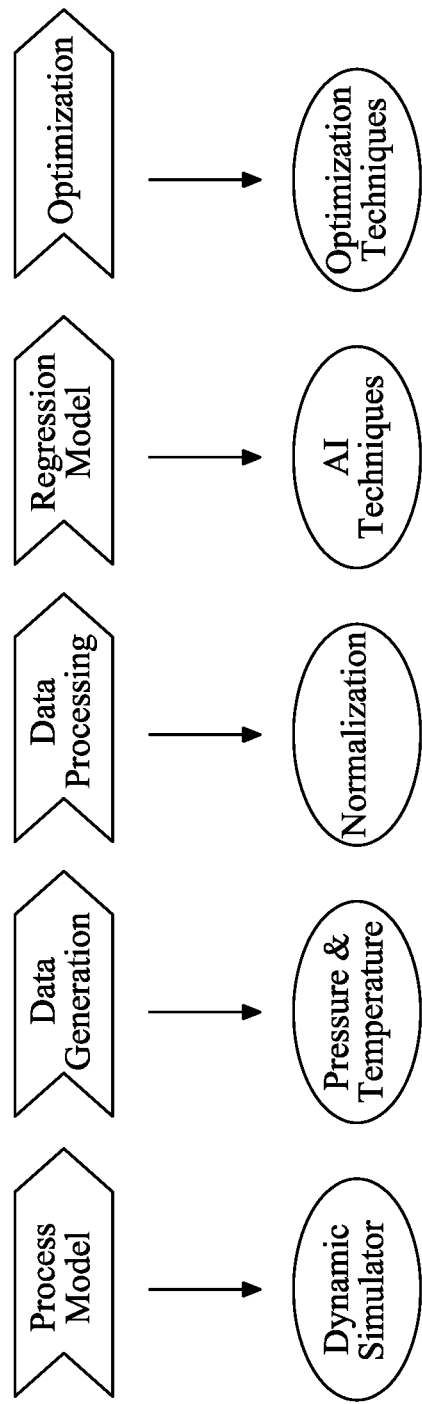
FIG. 4 is a diagram illustrating the optimization process including model development, data generation, and an AI model for optimization.

FIG. 4 depicts the process flow for the analysis of the GOSP plant. First, a process model is developed which simulates the GOSP plant. Using a dynamic simulator, the high pressure separator and the low pressure separator, were simulated, respectively. The stabilizer and the storage tank were also simulated using the dynamic simulator. In a non-limiting example, the dynamic simulator can be the OmegaLand simulator (See: Omegaland, Omega Simulation Company, Kosugi Building Nishiwaseda 2F, 2-20-9 Nishi-Waseda, Shinjuku-ku, Tokyo 169-0051, https://www.omegasim.co.jp/contents_e/product/ol/overview/).

Figure 5:
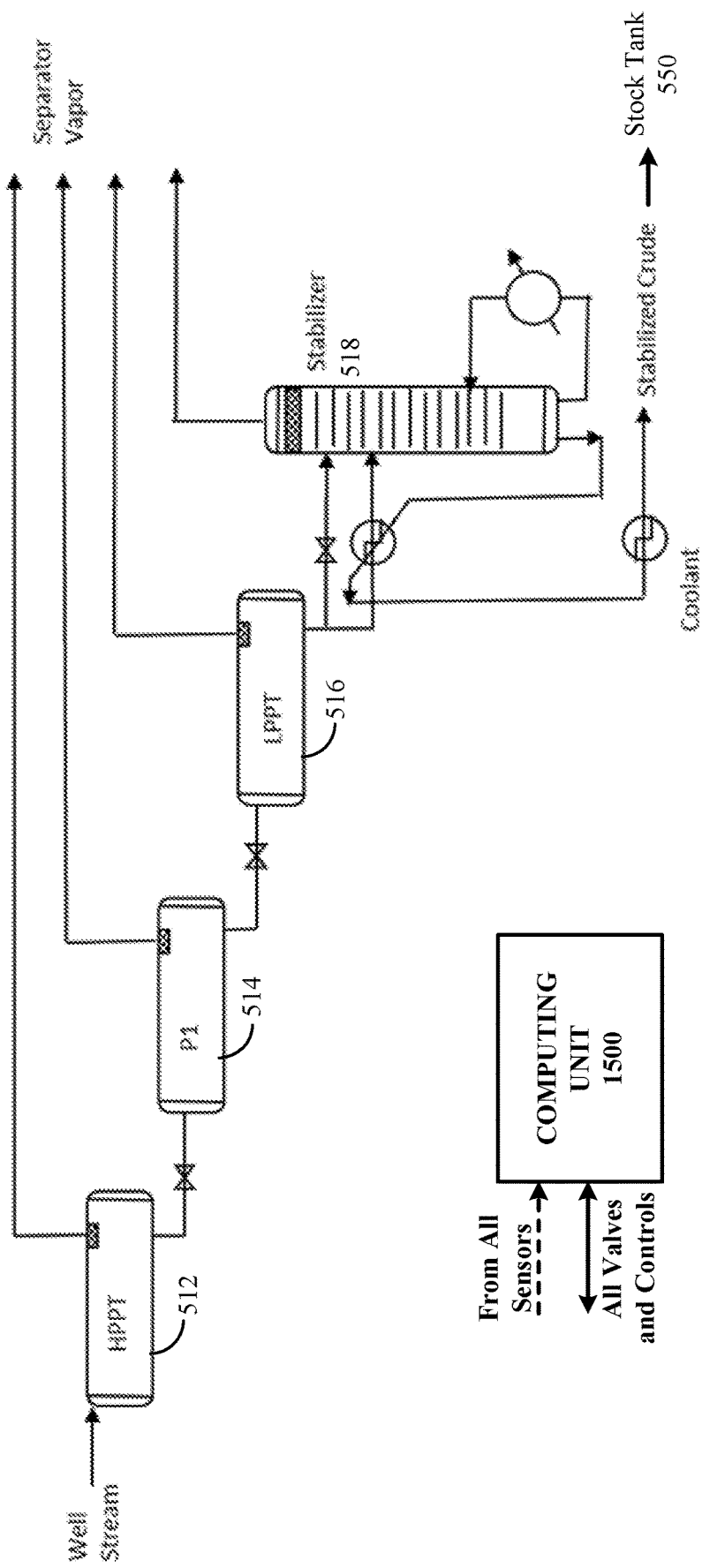
FIG. 5 is a diagram illustrating a stabilizer tower column with multi-stage separation in combination with HPPT, P1 and LPPT separators.

Referring back to FIG. 3, the oil train includes a series of separators (313, 314, 316), a stabilizer 318, and a stock tank 330. FIG. 5 shows a non-limiting example of a GOSP plant as used in the process of FIG. 4, the GOSP plant using multistage separation, including a high pressure separator 512, a P1 separator 514 and a low pressure separator 516 with a stabilizer 518 and a stock tank 550, each of which were simulated by the dynamic simulator.

Next, the process model is run under varying pressure and ambient temperature conditions to generate a plurality of datasets.

In a non-limiting example of a process run, the following conditions were set:

The model inputs were ambient temperature and LPPT pressure. The model output was liquid recovery in barrels per day.

Ambient temperature range=15-40° C.
LPPT pressure range=100-200 psi.
Stabilizer pressure=55 psi.

The resulting dataset included 714 data points. Of these, 70% were used to train an AI, 15% were used for validation of the AI and 15% were used for testing.

Figure 6:
FIG. 6 is a diagram illustrating the data normalization process.

In the data processing step, the data of the datasets is normalized between [−1, 1] or [0, 1]. FIG. 6 shows the data normalization between [−1, 1] for the data generated.

Artificial intelligence (AI) techniques have been used to develop models for the complex relationships between components in many fields, such as construction, medicine, transportation, and management. Analysis of problems once considered too complex to analyze due to complex behavior or a huge amount of data is made possible by AI methods. The emerging trends in data analytics and integrating multi-dimensional and multi-modal data enable value-added decision making in petroleum engineering applications. One such complex system is the gas-oil separation plant (GOSP), which is an integral part of the upstream petroleum industry. The complexities of GOSP operation are due in part to the integration of a plurality of different units and their governing principles. It is difficult to establish the relationships between the different units and the each unit depends on several operating parameters. In the present disclosure artificial intelligence techniques are applied to measurements and control of separators and stabilizers individually and collectively as representative of a complete systems of separators and stabilizers.

AI techniques that may be used include Artificial Neural Networks (ANN), Functional Network (FN), Support Vector Machines (SVM's), Decision trees (Dt's) and Fuzzy logic (FL). As these techniques are highly data dependent, ensuring data quality has a significant impact on their predictive performance. (See: Anifowose F, Adeniye S, Abdulraheem A., "*Recent Advances in the Application of Computational Intelligence Techniques in Oil and Gas Reservoir Characterization: A comparative study*", Journal of Experimental & Theoretical Artificial Intelligence. 2014; 26(4):551-70, incorporated herein by reference in its entirety).

A neural network technique has been used to predict the performance of a GOSP multistage separation facility, which may be used to plan and operate oil and gas separation facilities at the surface. Parameters such as gas/oil ratio (GOR) in different stage separation were predicted. Further, genetic algorithms to optimize the separator pressure in multi-stage separation have been developed. The genetic-based approach enhanced the oil separation process and increased separated oil API. (See: U.S. Pat. No. 8,805,587; also, Ghaedi M.; Ebrahimi, A.; Pishvaie, M., "*Application of Genetic Algorithm for Optimization of Separator Pressures in Multistage Production Units*", Chem Eng Commun. 2014; 201(7):926-38, both incorporated herein by reference in their entirety).

In a non-limiting example of using an artificial intelligence techniques, two AI models were developed to predict liquid recovery in the GOSP by incorporating each separation/stabilizer unit and their relationships. An Artificial Neural Networks (ANN) model and a Support Vector Machine (SVM) were both constructed and their performance was compared in the prediction of liquid recovery. Next, an optimization routine was developed to determine the optimal pressure corresponding to ambient temperature which gives maximum liquid recovery. The AI techniques are not limited to an artificial neural network and a support vector machine, but may be any type of AI model, including Functional Networks (FN), Artificial Neural Networks (ANN), Support Vector Machines (SVM's), Decision trees (Dt's) and Fuzzy logic (FL).

A regression model was built using an artificial intelligence (AI) technique. The AI technique is described as using either an Artificial Neural Network (ANN) or a Support Vector Machine (SVM), but is not limited to the ANN or SVM and may be any of an ANN, an SVM, Functional Networks (FN), Artificial Neural Networks (ANN), Support Vector Machines (SVM's), Decision trees (Dt's) and Fuzzy logic (FL).

In an optimization step, the results of the AI model were examined to determine optimum working pressures for the separators, as shown in FIG. 7-14.

The GOSP process simulation model was built to mimic the operational processes using a dynamic simulator in order to generate data needed to build AI models. In a non-limiting example, the dynamic simulator may be the OmegaLand dynamic simulator.

The GOSP processes, including instrumentation and process control, were configured and tested by running simulations for each individual unit as well as for the complete plant. During the process, the data from an initial PVT (pressure, volume, temperature) analysis was used as an input for the dynamic simulator. After PVT data verification in the dynamic simulator, the operational parameters were added based on historic data accumulated from gas flows, liquid flows and operating conditions. The simulation runs were performed by manipulating various process variables such as pressure and temperature with the Reid Vapor Pressure (RVP) as a constraint in order to obtain the predicted oil recovery.

To perform the optimization, the key operating variables and the optimization decision parameters were identified. The operating pressures of the GOSP separators at various operating temperatures were used as key optimization variables. Crude oil recovery was considered to be the optimization decision parameter. The GOSP process simulator was run for different process variables to analyze the effect of the process variables on oil recovery. The data was generated by manipulating the process variables in the process simulator and the results from simulations were used to train AI models. An example dataset of the input and output variables is shown in Table 1.

Datasets generated from the GOSP simulation model were used to train an AI model to predict liquid recovery. Operational data should be normalized before it can be used. Typically, data is normalized between [−1, 1] or [0, 1], as shown in FIG. 6, but other normalization methods such as log normalization can be used. Once the data is normalized, an AI model such as Artificial Neural Network (ANN) or a Support Vector Machine (SVM) can be trained. The output of the AI model is then further analyzed.

After AI model development, process optimizations were performed to determine the optimal separator pressure that results in maximum liquid recovery for each ambient temperature. Then, a correlation was developed using regression methods to determine the relationship between the ambient temperature and the optimal separator pressure.

TABLE 1

Sample Input and Output Data of the GOSP Simulation Model.

| Run | Inputs | | | Temperatures | | | | | | | |
|---|---|---|---|---|---|---|---|---|---|---|---|
| | Ta C. | Separator Pressure psi | $1^{st}$ Separator | $2^{nd}$ Separator C. | STO | | API | COR | FVF | Oil Product Bbl/Day | H28 ppm by wt. |
| 1 | 15 | 100 | 62.01754922 | 43.68438924 | 15.64243779 | | 33.92786973 | 808.5863761 | 1.456959338 | 34318.04763 | 26.77369786 |
| 2 | 15 | 102 | 62.01754981 | 43.74755649 | 15.64243779 | | 33.93111051 | 805.926096 | 1.454292595 | 34380.97682 | 27.08359251 |
| 3 | 15 | 104 | 62.01755205 | 43.89145101 | 15.64243779 | | 33.94026424 | 807.4599539 | 1.455720882 | 34347.17417 | 25.40299747 |
| 4 | 15 | 106 | 62.01755204 | 43.89146427 | 15.64243779 | | 33.94071037 | 807.2349498 | 1.45530853 | 34351.76093 | 25.42898124 |
| 5 | 15 | 108 | 62.01754957 | 43.99281432 | 15.64243779 | | 33.94642212 | 806.8756535 | 1.455071776 | 34362.53553 | 24.89745897 |
| 6 | 15 | 110 | 62.01755157 | 44.14525824 | 15.64243779 | | 33.9542638 | 804.086356 | 1.452679972 | 34419.14322 | 24.67845886 |
| 7 | 15 | 112 | 62.01755276 | 44.18963457 | 15.64243779 | | 33.95657896 | 806.2228587 | 1.454648573 | 34372.56318 | 23.98797306 |
| 8 | 15 | 114 | 62.01755025 | 44.28511756 | 15.64243779 | | 33.96112102 | 805.9308936 | 1.454463391 | 34376.9688 | 23.59790183 |
| 9 | 15 | 116 | 62.01755192 | 44.3795722 | 15.64243779 | | 33.96550481 | 805.6536151 | 1.454300927 | 34380.72092 | 23.25437787 |
| 10 | 15 | 118 | 62.01754899 | 44.47140412 | 15.64243779 | | 33.96917047 | 805.3825564 | 1.454111489 | 34385.25887 | 22.93501608 |

A simulation model including the stabilizer unit was used to generate the data for liquid recovery at different conditions of ambient temperature ($T_a$) and separator pressure. The model inputs were the ambient temperature and the LPPT pressure. The model output was the amount of liquid recovered in barrels per day. Data was generated by setting the LPPT pressure within a range of 100-200 psi, the stabilizer pressure at one value (55 psi) and setting the ambient temperature at a range of values (15-41° C.). The dynamic simulator with the GOSP model was run at all ranges of separator pressure values for a specific ambient temperature until the model reached a steady state at each run. The next ambient temperature was input and the process was repeated to cover the whole ambient temperature range. The ambient temperature was incremented by 2° C. and separator pressure was 2 psi in every step.

An artificial neural network (ANN) is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Neural nets learn by processing examples, each of which contains a known "input" and "result," forming probability-weighted associations between the two, which are stored within the data structure of the net itself (The "input" here is more accurately called an input set, since it generally consists of multiple independent variables, rather than a single value.) Thus, the "learning" of a neural net from a given example is the difference in the state of the net before and after processing the example. After being given a sufficient number of examples, the net becomes capable of predicting results from inputs, using the associations built from the example set. If a feedback loop is provided to the neural net about the accuracy of its predictions, it continues to refine its associations, resulting in an ever-increasing level of accuracy. In short, there is a direct relationship between the number and diversity of examples processed by a neural net and the accuracy of its predictions. The ability of an artificial neural network to predict relationships and outcomes improve with successive input datasets. In the present disclosure, the inputs to the artificial neural network are datasets simulated by the dynamic simulator for varying pressures and ambient temperatures as related to liquid recovery.

A support vector machine (SVM) is a supervised machine learning model that uses classification algorithms for two-group classification problems. After applying sets of labeled training data to the SVM, a support vector regression (SVR) model can be used to fit the data to a line or a hyperplane within confidence bounds defined by a distance of ±E (epsilon). The confidence bounds are set by the operator of the SVM and can be tuned for a desired level of accuracy. The accuracy of the model can be tested by statistical comparison methods, such as coefficient of determination ($R^2$) and Mean Square Error (MSE). New datasets may then be mapped into that same space and data samples are fit to the trained line within the confidence bounds.

In statistics, the coefficient of determination, $R^2$, is the proportion of the variance in the dependent variable (output value) that is predictable from the independent variable(s) (input value). A high $R^2$ value indicates that the output value is close to the desired set of output values. Variance is the expectation of the squared deviation of a random variable from its mean. Informally, it measures how far a set of numbers are spread out from their average value.

Next, the artificial neural network (ANN) and the Support Vector Machine (SVM) were used to build the two different models for predicting the liquid recovery, where the input parameters are ambient temperature ($T_a$) and separator pressure and the output was liquid recovery. The ranges of the two input parameters are shown in Table 2.

TABLE 2

| Input Parameter Ranges | |
|---|---|
| Parameter | Range |
| Ambient Temperature (° C.) | 15-41 |
| Separator Pressure (psi) | 100-200 |

Amongst the numerous runs of the simulator, 710 data points were used to develop the AI models, where 70% of the dataset was used to train the model while 15% of the dataset was used for validation and 15% of the dataset was used for testing. Selected data was normalized between [0, 1]. For the ANN model, one hidden layer was used with 20 neurons and the tan-sigmoid function as the activation function, while for the SVM a Gaussian function kernel function was used.

Figure 7:
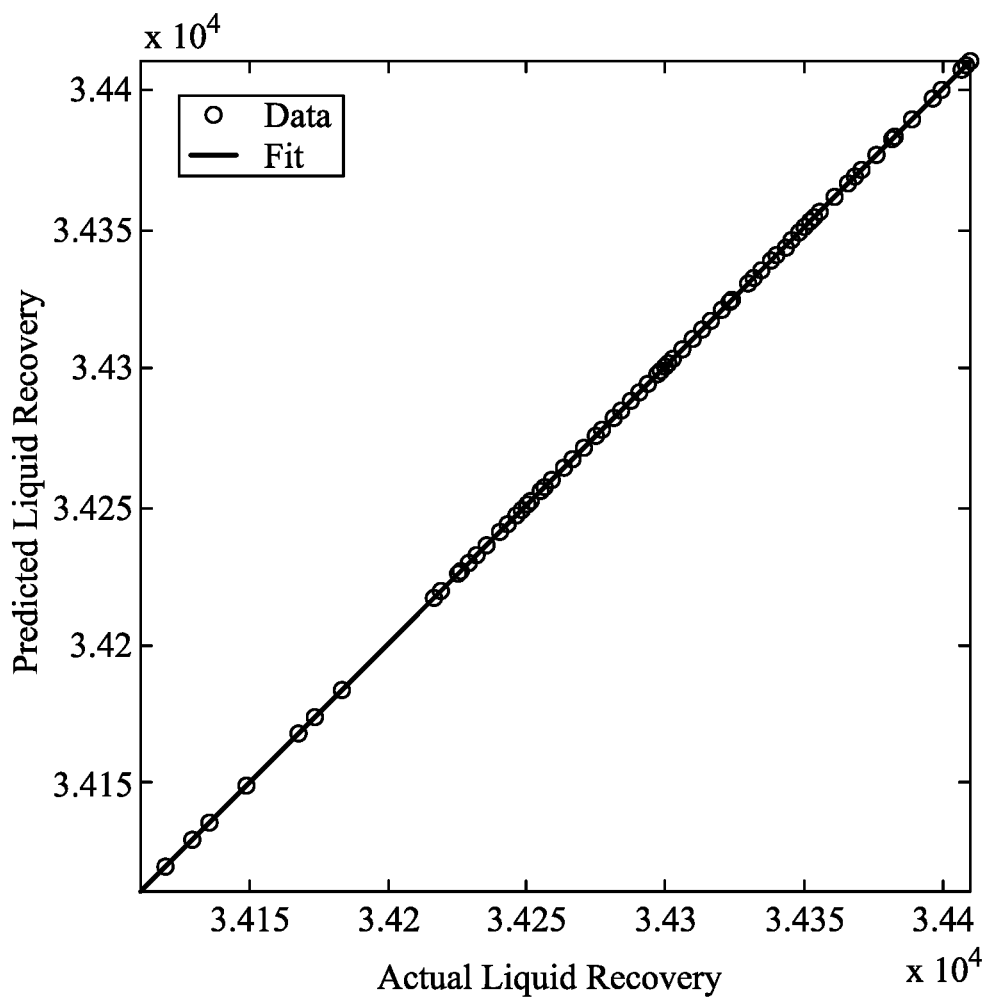
FIG. 7 is a graph illustrating data fitting for an ANN model.
Figure 8:
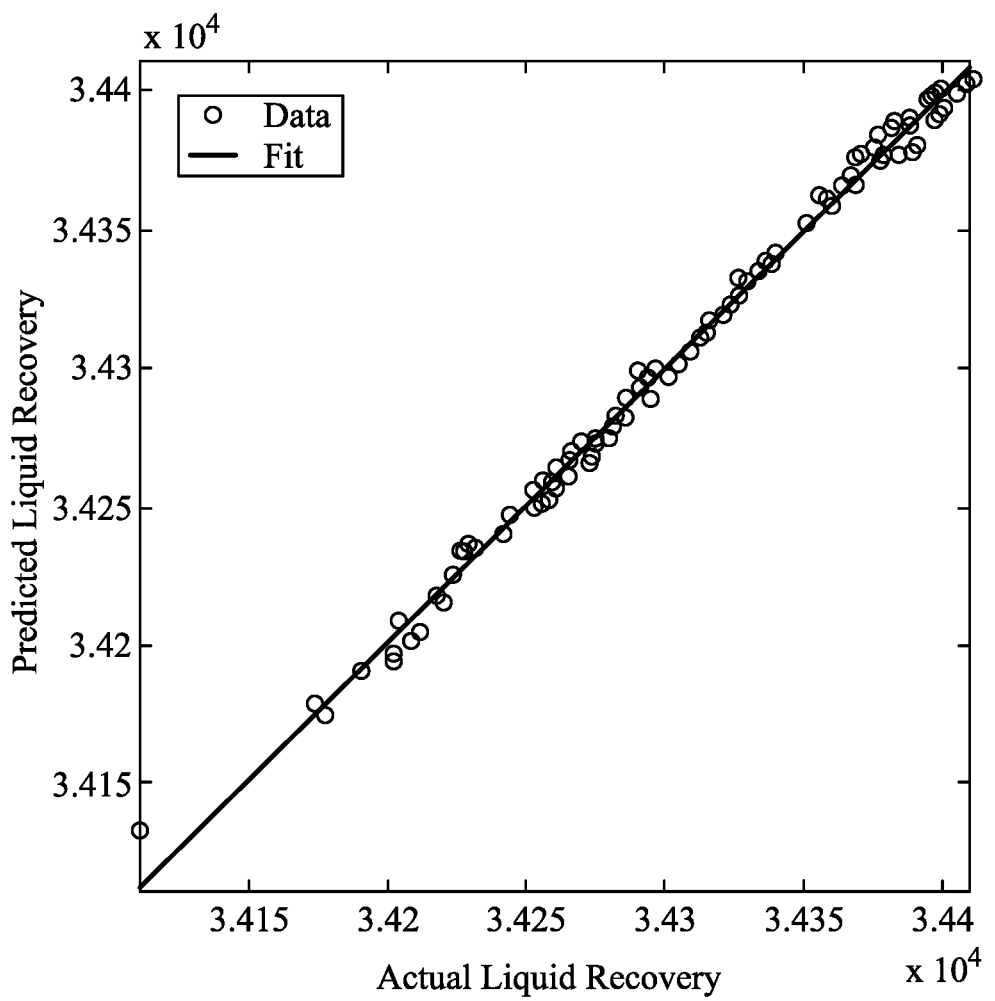
FIG. 8 is a graph illustrating data fitting for an SVM model

FIG. 7 shows data fitting for the liquid recovery using the ANN model and FIG. 8 shows data fitting for the SVM model. Both the ANN model and the SVM model performed well in predicting liquid recovery. Table 3 shows the performance analysis for both techniques using the coefficient of determination ($R^2$) and mean square error (MSE). From this comparison, it can be seen that both methods closely predicted liquid recovery but the ANN was more accurate.

TABLE 3

| Performance Analysis | | |
|---|---|---|
| Performance Measure | ANN | SVM |
| $R^2$ | 1 | 0.997 |
| MSE | 0.147 | 26.972 |

Figure 9:
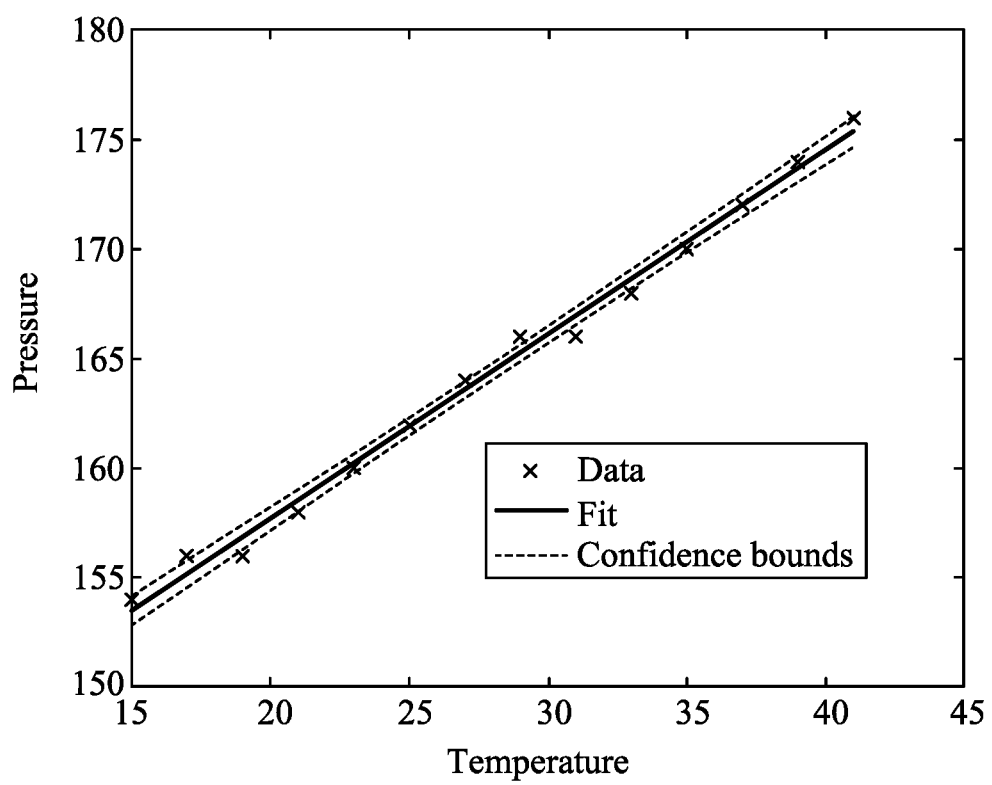
FIG. 9 is a graph of pressure as a function of temperature showing the confidence level.

FIG. 9 shows a plot of pressure versus temperature, showing the predicted pressure for each temperature, a line fit to the data and the confidence bounds. It can be seen that the pressure versus temperature is linear within the confidence bounds.

Figure 10:
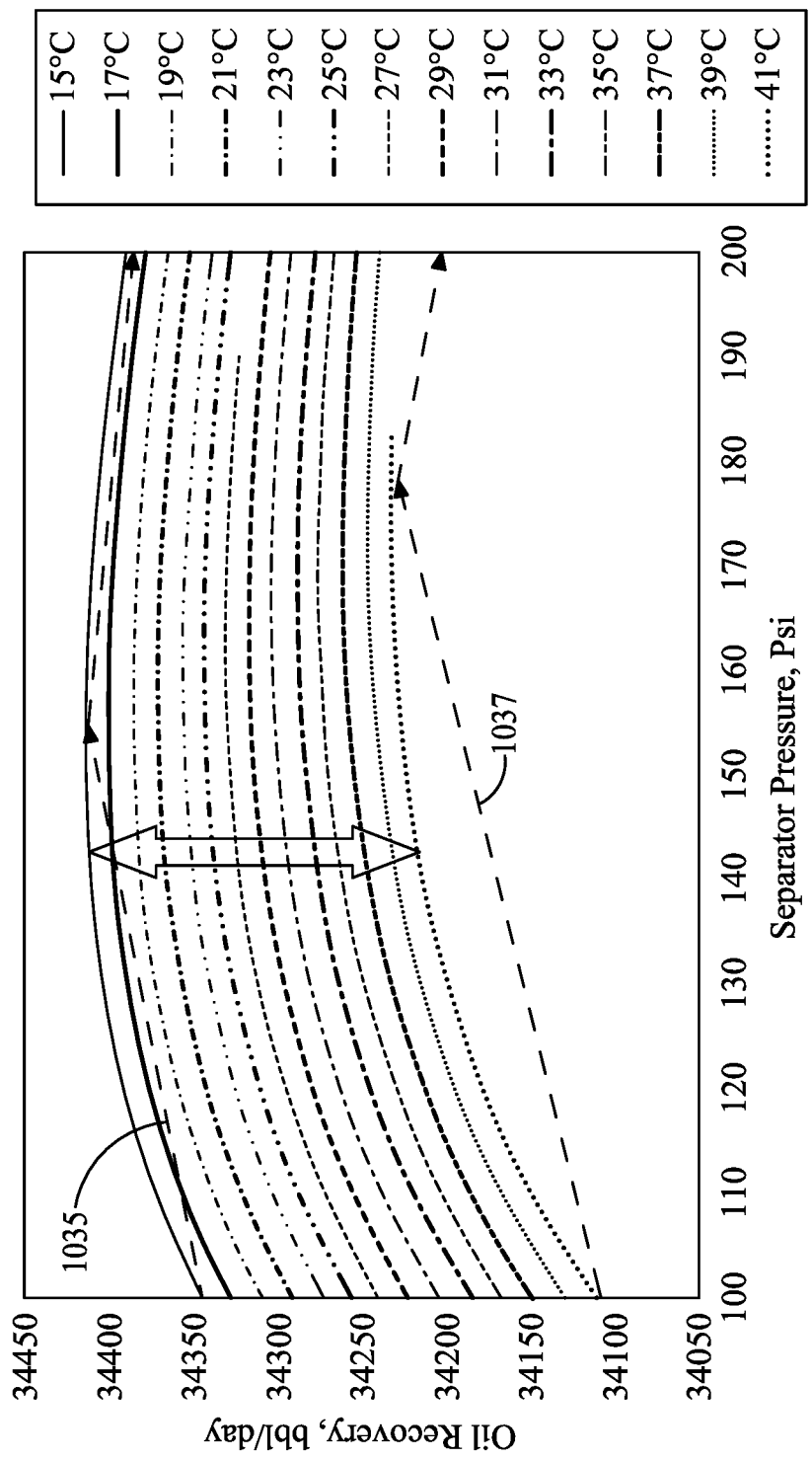
FIG. 10 is a graph illustrating the oil recovery as a function of separator pressure for different ambient temperatures.

FIG. 10 shows the oil recovery plotted as a function of GOSP separator pressure for ambient temperatures, $T_a$, in the range of 15-41° C. The stabilizer pressure was kept constant at 55 psi. The shapes of the curves show that, for any particular temperature, liquid (oil) recovery increases with an increase in pressure up to certain value and then decreases with further increases in pressure. The pressure that corresponds to the maximum oil recovery is the optimum pressure at that temperature. For the complete range of separator pressures (100-200 psi) and $T_a$ (15-41° C.), it can be observed that for any fixed temperature there is an optimum value of separator pressure at which maximum liquid recovery can be obtained for given feed and operating conditions. For example, as shown by dotted line 1035, at 15° C., the optimum separator pressure is about 150 psi, which yields a maximum liquid recovery of about 34420 barrels per day. However, at 41° C., as shown by dotted line 1037, at a higher separator pressure of about 178 psi, the maximum liquid recovery drops to only 34,225 barrels per day. The down arrow shows the trend of decreasing liquid recovery for rising temperature. Additionally, the separator pressures needed to achieve the maximum liquid recovery increase with rising temperature, which adds to the cost of recovery.

Figure 11:
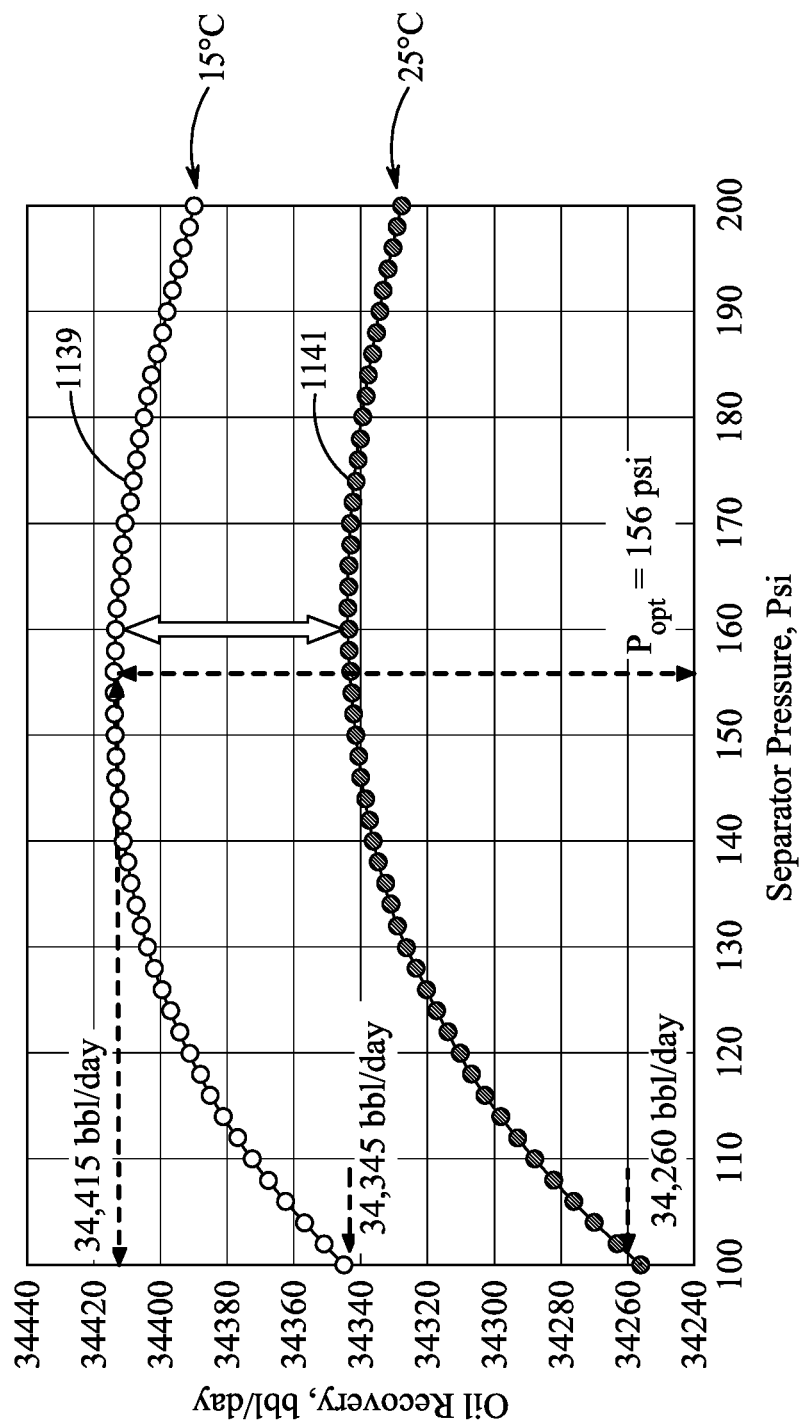
FIG. 11 is a graph illustrating the oil recovery at optimum separator pressure (winter case)

FIG. 11 shows a typical temperature range for a time period during the year when the temperature is lower than the yearly average temperature, such as during winter months in some countries. In a non-limiting example, the lower temperature, $T_1$, may be 10° C. lower than the average temperature, $T_{avg}$. The values of $T_1$ and $T_{avg}$ may be determined with respect historical ambient temperature records for the location of the GOSP. In another non-limiting example, the winter season may be in Saudi Arabia, which has many GOSP plants. Curve 1139 shows that the optimum separator pressure for an ambient temperature, $T_a$, of approximately 15° C., is 156 psi. At 15° C. and separator pressure of 100 psi, the liquid (oil) recovery is 34,345 barrels per day. However, if the separator is set to operate at 156 psi ($T_a$=15° C.), the liquid recovery increases to 34,415 barrels per day (bbl/D). Therefore, a change in separator pressure of 56 psi at $T_a$=15° C. increases the liquid recovery by 70 barrels per day. For a GOSP with an inlet feed stream of 100,000 barrels per day, adjustment of the separator pressure for each ambient temperature yields a 0.07% per day improvement of GOSP production. Also, the effect of temperature variation at fixed pressure (160 psi) indicates that oil recovery increases with reduction in temperature (see trend arrow). The maximum temperature during the day time reaches 25° C., while average minimum temperature during the night time is 15° C. with variation of (±10 during the day and night time). This temperature range represents typical winter conditions in Saudi Arabia. For example, curve 1141 shows the maximum separator pressure of 160 psi increases the yield at 25° C. from 34,260 barrels/day to about 34,345 barrels per day, which is an increase of about 85 barrels per day or 0.2%.

Figure 12:
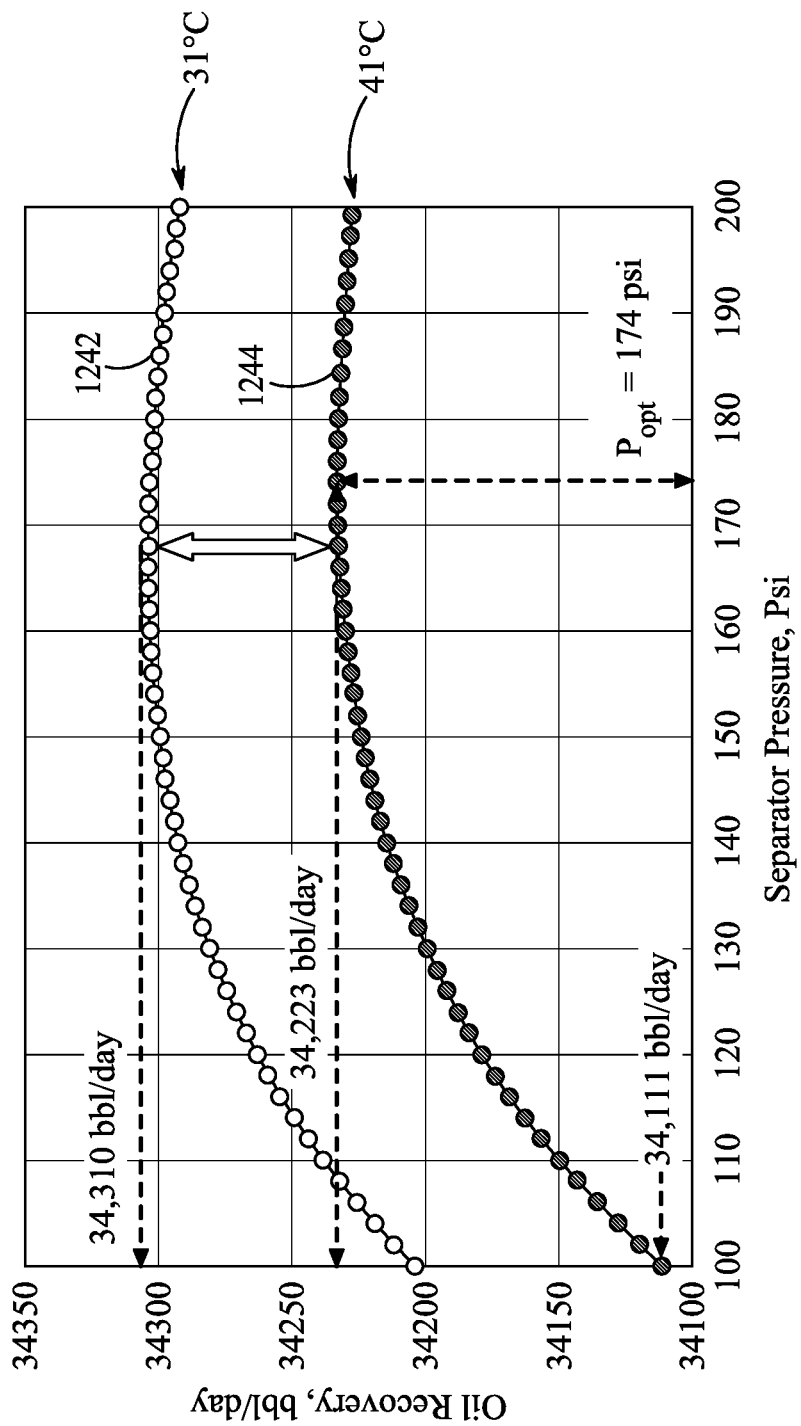
FIG. 12 is a graph illustrating the oil recovery at the optimum separator pressure (summer case)

Similarly, FIG. 12 shows a typical temperature range for a time period during the year when the temperature is higher than the yearly average temperature, such as during summer months in some countries. In a non-limiting example, the higher temperature, $T_h$, may be 20° C. higher than the average temperature, $T_{avg}$. The values of $T_h$ and $T_{avg}$ may be determined with respect historical ambient temperature records for the location of the GOSP. In a non-limiting example, the summer season may be in Saudi Arabia, which has many GOSP plants. It can be seen that the optimum liquid recovery at a temperature of 41° C. is found when the pressure is 174 psi. The liquid recovery corresponding to 41° C. and separator pressure 100 psi is 34,111 bbl/D. However, if the GOSP separator is set to operate at 174 psi (temperature=41° C.) the liquid recovery increases to 34,223 bbl/D as shown by curve 1244. The change in separator pressure can increase the liquid recovery by 112 bbl/D. The increase in oil recovery is 112 bbl/D, which is a 0.11% per day increase in GOSP production.

Also, the effect of temperature variation (see wide arrow, FIG. 12) at a fixed pressure (170 psi) indicates that oil recovery increases with reduction in temperature (from about 34,223 at 41° C. to about 34,310 at 31° C., as shown by curve 1242). The temperature range represents a typical summer in Saudi Arabia. The average maximum temperature during the daytime reaches ~41° C. while average minimum temperature during the night time is ~31° C. with variation of (±10 during the day and night time).

The results show that for the given set of operating conditions, liquid recovery is significantly affected by the temperature. At a low temperature (~15° C.), the liquid recovery is significantly higher than the liquid recovery at a higher temperature (~41° C.) affected the liquid recovery and performance of the GOSP plant.

Variations in the ambient temperature are not controllable but these results show that there is an opportunity to nullify the effect of temperature on oil recovery by setting the pressure conditions at which maximum oil recovery can be obtained. The parameters can be adjusted by developing an Operation Decision Support System (ODSS) which identifies a most productive pressure according to the variation in temperature in order to maximize the liquid recovery of the GOSP plant.

Oil producing countries may produce an average of 10 million barrels of crude oil daily. For example, in Saudi Arabia, a combination of several GOSPs can produce this quantity of crude oil. Thus, any slight improvement in production has a significant commercial impact. For a 0.1% increase in the oil recovery, the commercial gain, based on the average capacity of 10 million barrels of crude oil and average price of the crude oil $60 per barrel, is very high as shown in Table 4. It can be observed that 0.1% improvement can generate revenue of $219 million dollars yearly.

TABLE 4

The Commercial Impact of a 0.1% Improvement in Production

|  | Daily | Monthly | Yearly |
|---|---|---|---|
| Production | 10 Million Barrels | 300 Million Barrels | 3.65 Billion Barrels |
| Revenue | $600 Million | $18 Billion | $219 Billion |
| 0.1% Improvement | $600,000 | $18 Million | $219 Million |

To illustrate the benefits of adjusting GOSP separator pressure to adapt to variations in the ambient temperature, two cases were shown as follow:

Case 1: Winter Season.

Figure 13:
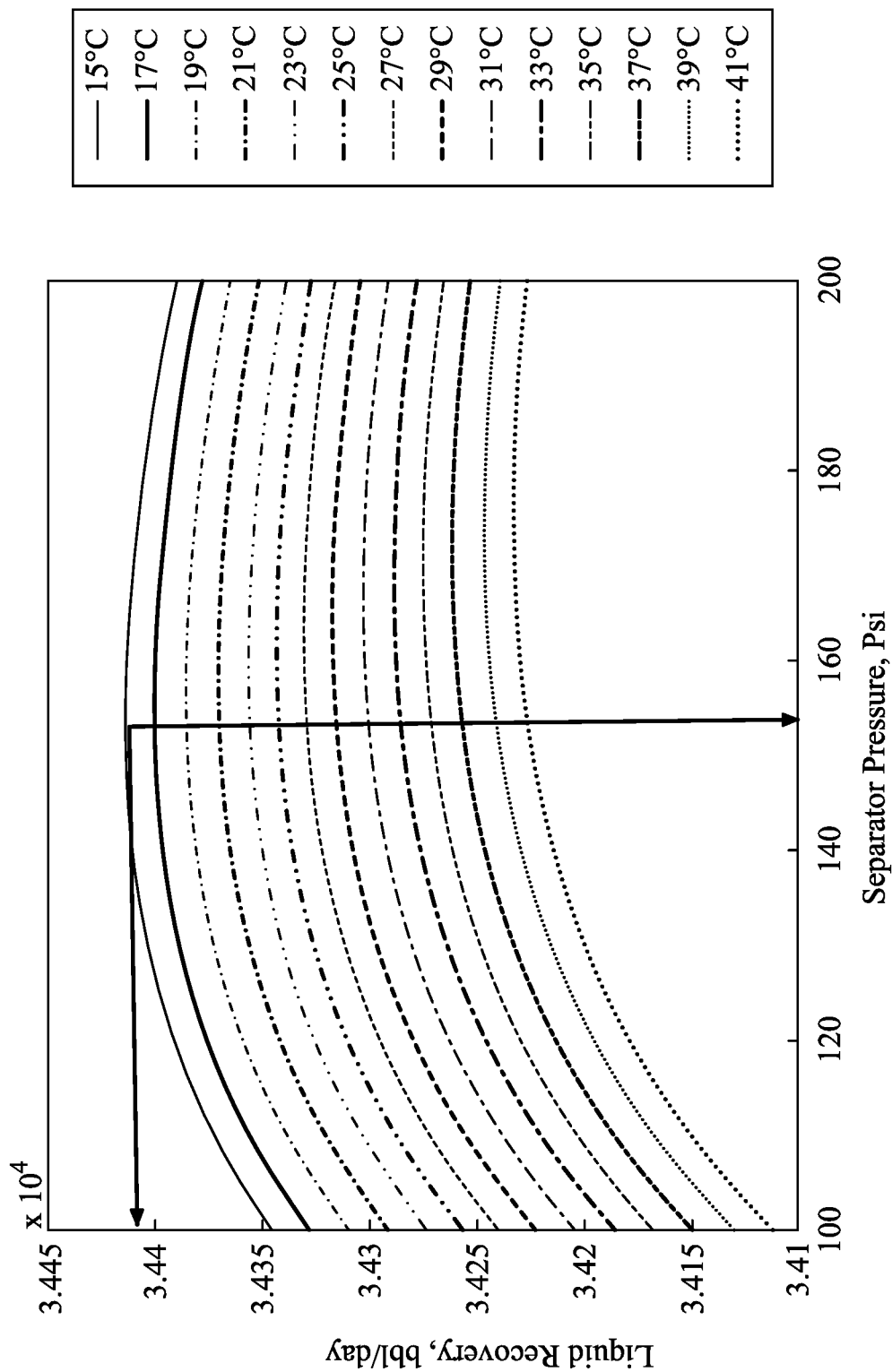
FIG. 13 is a graph illustrating the liquid recovery at the optimum separator pressure (156 psi) at 15° C. (winter case)

Case 1 represents typical winter conditions having an average temperature of 15° C. A graph of liquid recovery (bbl/day) versus separator pressure (psi) is shown in FIG. 13, in which the optimum separator pressure for the GOSP at an ambient temperature of 15° C. is 156 psi. The base GOSP separator pressure is 100 psi while all the other parameters are kept constant. The additional liquid recovery obtained in this case is 70 bbl/D compared to the base pressure.

The potential commercial gain on a daily and seasonal basis of using the GOSP analysis of the present disclosure is shown in Table 5, which indicates that adjusting the pressure of separator to 156 psi can generate extra revenue of $371,610 in winter per 100,000 barrels of crude oil. In a non-limiting example of Saudi Arabia crude oil production for the winter season, the modification of operating the separators at 156 psi during the winter season translates to a projected gain of $37,161,000 for the 10 million barrel daily capacity of Saudi Arabia crude oil production.

TABLE 5

Commercial Impact of Adjusting Separator Pressure to 156 psi
at 15° C. Average Ambient Temperature During the Winter Season

| Temperature (° C.) | Separator Pressure (psi) | bbl/day (per 100,000 barrels) | Income $/day (at $60/bbl) | Income per Season (90 days) |
|---|---|---|---|---|
| 15 | 100 | 34345 | $2,060,700 | $185,463,000 |
| 15 | 156 | 34414 | $2,064,840 | $185,835,600 |
| Additional Profit | | 69 | $ 4,140 | $ 372,600 |

Case 2: Summer Season.

Figure 14:
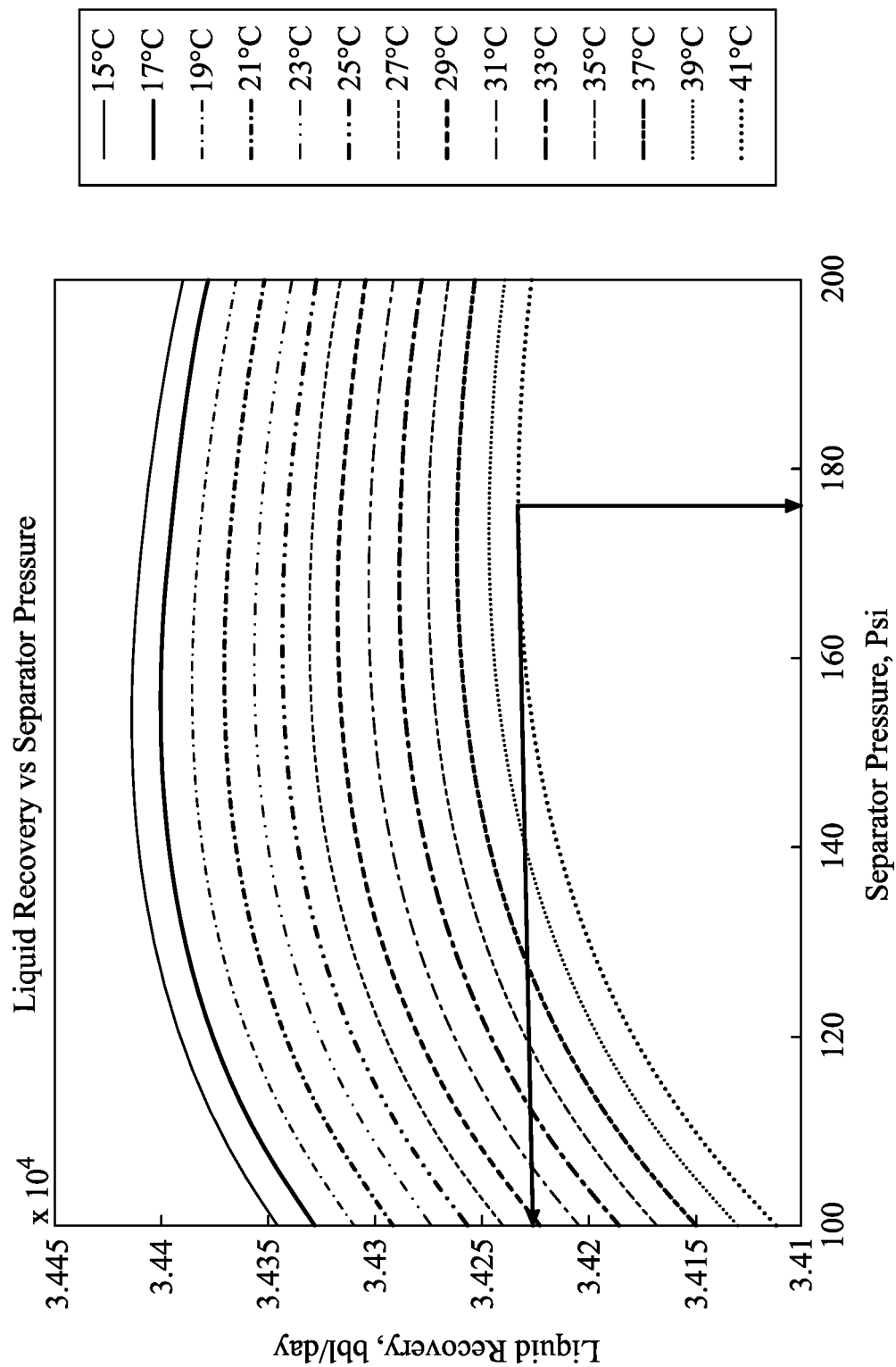
FIG. 14 is a graph illustrating the liquid recovery at the optimum pressure (174 psi) at 41° C. (summer case).

Case 2 represents typical summer conditions having an average temperature of 41° C. A graph of liquid recovery (bbl/day) versus separator pressure (psi) is shown in FIG. 14, in which the optimum separator pressure for the GOSP at an ambient temperature of 41° C. is 174 psi. The base separator pressure is 100 psi while all the parameters are constants. The additional liquid recovery obtained at 174 psi is 122 bbl/D compared to the liquid recovery at 100 psi.

Figure 15A:
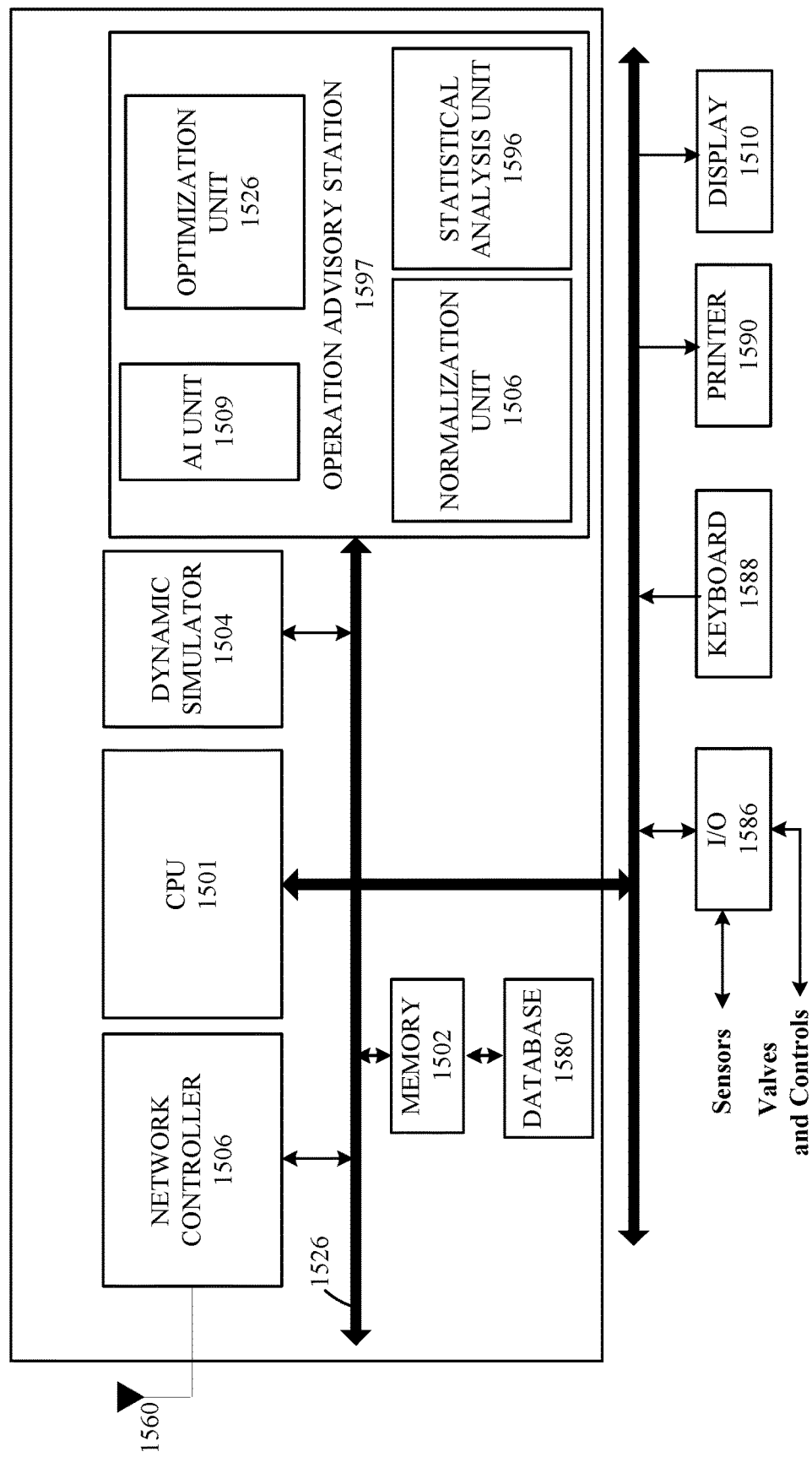
FIG. 15A illustrates the computing system, according to certain embodiments.

FIG. 15A illustrates some aspects of the computing device 1500 as pertain to the GOSP optimization and control of the GOSP plant. The computing device includes a network controller 1506 and antenna 1560 for communication with operators and with wireless sensors, valves or other controls of the GOSP. The CPU 1501 is a non-transitory computer readable medium having instructions stored therein that, when executed by one or more processor, cause the one or more processors to perform the optimization and control steps of the present disclosure. The CPU is connected to a dynamic simulator 1504, which models the separators, stabilizer and storage tank and generates datasets of pressure versus ambient temperature data, a normalization unit 1506, which normalizes the datasets, and an operation advisory station 1597, which includes an AI unit 1509, (which may be an artificial neural network (ANN), a support vector machine (SVM), or any of Functional Networks (FN), Decision trees (Dt's) and Fuzzy logic (FL)) and which correlates the data, a statistical analysis unit 1596, which calculates the $R^2$ and MSE values to define the relationships between the training data and the testing data. An optimization unit 1526 analyzes the statistical data to determine whether pressures should be adjusted at any of the separators to enhance the liquid recovery volume. The CPU is connected to the I/O device 1586 to send/receive commands/signals to the sensors and to send actuation signals to the separator control valves of the GOSP. The computing unit includes a memory 1502 and a database 1580. The database may hold simulations, historic PVT data, and the like, as needed by the optimization unit to make decisions as to whether the pressure at the separators should be adjusted for higher liquid recovery. Peripherals 1518 can include a keyboard, mouse, printer, display, or the like as needed to operate the computing unit 1500. Further details of the computing unit are discussed with respect to FIG. 15B and FIG. 16-18 below.

The potential commercial gain on a daily and seasonal basis of using the GOSP analysis of the present disclosure is shown in Table 6, which indicates that adjusting the GOSP pressure to 174 psi can generate extra revenue of $657,000 dollars in summer per 100,000 barrel of crude oil. In a non-limiting example of Saudi Arabia crude oil production for a season, the modification of operating the separators at 174 psi during the summer season translates to a projected gain of $65,700,000 for each 10 million barrel capacity of Saudi Arabia crude oil production.

TABLE 6

The Commercial Impact of Adjusting Separator Pressure to 174
psi at 41° C. Ambient Temperature During the Summer Season

| Temperature (° C.) | Separator Pressure (psi) | bbl/day | Income $/day (at $60/bbl) | Income per Season (90 days) |
|---|---|---|---|---|
| 41 | 100 | 34,111.54 | $2,046,693 | $184,202,280 |
| 41 | 174 | 34,233.22 | $2,053,993 | $184,859,370 |
| Additional Profit | | 121.68 | $ 7,301 | $ 657,000 |

Methods of the present disclosure maximize the oil recovery through pressure optimization for the separators in a GOSP plant. The methods recommend an optimum pressure for each ambient temperature which results in maximum liquid recovery for interconnected GOSP units including a stabilizer. The following conclusions may be drawn based on the experimental results:

1) Separator pressure was found to have a significant effect on the oil recovery from each individual separation stage.
2) An artificial neural network (ANN) was able to predict the optimum pressure with high accuracy.
3) Relationships based on the input fluid composition, gas and liquid rate and process parameters were established by using AI techniques.
4) The LPPT pressure was found to have a significant effect on the oil recovery from the individual separation stages.
5) Oil recovery of the GOSP increases as separator pressure increases until it reaches an optimum separator pressure, then oil recovery decreases with further increase in separator pressure.
6) Oil recovery appears to be strongly dependent on ambient temperature. The liquid oil recovery decreases with increasing ambient temperature.
7) At high temperatures (during summer), higher number of barrels of liquid oil per day can be obtained compared to the low temperatures (winter) by adjusting the separator pressure. This result has noticeable economic value to countries with hot climates.
8) A small adjustment in the separator pressure can lead to significant revenue generation. Although the improvement appears marginal at approximately 0.1%, the economic impact is large due to the large volume of oil recovered, thus significant additional revenue can be gained. In the non-limiting example of GOSP plants in Saudi Arabia, more than 219 million dollars yearly can be achieved.

Therefore, the methods of the present disclosure yield operational advisory solutions, which are tools for oil operators which can add significant value to oil processing facilities with only minor investment.

Embodiments of the present disclosure may also be as set forth in the following parentheticals.

(1) A method for maximizing stabilized crude oil recovery in a gas-oil separation plant (GOSP) 300, comprising building, by a computing unit 1500 including a dynamic simulator 1504, a process model of the gas-oil separation plant, wherein the model includes at least a plurality of separators (312, 314, 316), a stabilizer 302 and a storage tank 330 of the GOSP, simulating the crude oil recovery of the GOSP under varying operating pressures of at least one separator of a plurality of separators for different ambient temperatures surrounding the stabilizer to generate a simulated stabilized crude oil recovery dataset, normalizing (see FIG. 4, 6, also 1506, FIG. 15A), by the computing unit, the simulated stabilized crude oil recovery dataset to generate a normalized stabilized crude oil recovery dataset; training, by the computing unit, an artificial intelligence unit with a first portion of the normalized stabilized crude oil recovery dataset to generate a trained artificial intelligence model; inputting to the trained artificial intelligence model a second portion of the normalized stabilized crude oil recovery dataset; predicting the crude oil recovery for each separator pressure at each ambient temperature; determining, by the computing unit, an optimal pressure which maximizes stabilized crude oil recovery for each ambient temperature; and adjusting, by the computing unit, the operating pressures of the plurality of separators of the GOSP to compensate for ambient temperature conditions.

(2) The method of (1), wherein the artificial intelligence unit includes an artificial neural network (ANN); including: training, by the computing unit, the ANN with the first portion of the normalized stabilized crude oil recovery dataset to generate a trained output dataset; inputting the second portion of the normalized stabilized crude oil recovery dataset to the trained ANN; predicting, by the trained ANN, a stabilized crude oil recovery value at each separator pressure for each ambient temperature; and determining, by the computing unit, the optimal pressure which for each ambient temperature.

(3) The method any one of (1) to (2), further comprising measuring the separator pressures for each ambient temperature of the GOSP, measuring an amount of stabilized crude oil recovered in the storage tank at each separator pressure and ambient temperature over a time period, applying current datasets including measured separator pressures, ambient temperatures and amounts of stabilized crude oil recovered in the storage tank of the GOSP to the trained ANN to predict the stabilized crude oil recovery at each separator pressure for each ambient temperature; determining a statistical distance of the current stabilized crude oil recovery from the predicted stabilized crude oil recovery; determining, by the computing unit, the optimal pressure which maximizes stabilized crude oil recovery for each ambient temperature; and adjusting the operating pressures of the plurality of separators of the gas-oil separation plant to compensate for current ambient temperature conditions.

(4) The method of any one of (2) to (3), further comprising testing the accuracy of the trained ANN by inputting a third portion of the normalized stabilized crude oil recovery dataset to generate a testing output dataset; and performing a statistical analysis between the trained output dataset and the testing output dataset by calculating a coefficient of determination, $R^2$, between the predicted stabilized crude oil recovery and the testing stabilized crude oil recovery for each pressure and each ambient temperature.

(5) The method of any one of (2) to (4), further comprising performing a statistical analysis by calculating a mean squared error (MSE), between the predicted stabilized crude oil recovery and the testing stabilized crude oil recovery for each pressure and each ambient temperature.

(6) The method of (1) wherein the artificial intelligence unit includes a support vector machine (SVM), the method further comprising: training, by the computing unit, the support vector machine (SVM) with the first portion of the normalized stabilized crude oil recovery dataset to generate a trained SVM; predicting, by the trained SVM, a stabilized crude oil recovery at each separator pressure for each ambient temperature; and determining, by the computing unit, the optimal pressure which maximizes stabilized crude oil recovery for each ambient temperature.

(7) The method of (6), further comprising: measuring the separator pressures for each ambient temperature of the GOSP, measuring an amount of stabilized crude oil recovered in the storage tank of the GOSP at each separator pressure and ambient temperature over a time period, applying current datasets including measured separator pressures, ambient temperatures and amounts of stabilized crude oil recovered in the storage tank of the GOSP to the trained SVM to predict the stabilized crude oil recovery at each separator pressure for each ambient temperature, determining a statistical distance of the current maximum stabilized crude oil recovery from the predicted maximum stabilized crude oil recovery, determining, by the computing unit, the optimal pressure which maximizes stabilized crude oil recovery for each ambient temperature and adjusting the operating pressures of the plurality of separators of the gas-oil separation plant to compensate for current ambient temperature conditions.

(8) The method of any one of (6) to (7), further comprising testing the accuracy of the trained SVM by inputting a third portion of the normalized stabilized crude oil recovery dataset to generate a testing output dataset and performing a statistical analysis between the trained output dataset and the testing output dataset by calculating a coefficient of determination, $R^2$, between the predicted stabilized crude oil recovery and the testing stabilized crude oil recovery for each pressure and each ambient temperature.

(9) The method of any one of (6) to (8), further comprising performing a statistical analysis between the trained output dataset and the testing output dataset by calculating a mean squared error (MSE), between the predicted stabilized crude oil recovery and the current stabilized crude oil recovery for each pressure and each ambient temperature.

(10) The method of (1), further comprising measuring the ambient temperature surrounding the separators, measuring the operating pressure of a low pressure production trap (LPPT) separator (516, FIG. 5), adjusting the operating pressure of the LPPT to the operating pressure which maximizes stabilized crude oil recovery for the measured ambient temperature.

(11) The method of (10), further comprising increasing the operating pressure of the LPPT by at least 50% from a base operating pressure during months of the year which are colder than an average yearly temperature; and increasing the operating pressure of the LPPT by at least 70% from a base operating pressure months of the year which are warmer than an average yearly temperature.

(12) The method of (1), wherein the artificial intelligence unit includes any one of artificial neural network (ANN), a support vector machine (SVM), a functional networks (FN), a decision tree (DT) and fuzzy logic (FL).

(13) A system for maximizing stabilized crude oil recovery, comprising a gas-oil separation plant (GOSP) 300 having components including a plurality of separators (312, 314, 316), a stabilizer 302, a storage tank 330 configured for holding stabilized crude oil and a computing unit 1500 operatively connected to the components, the computing unit including a computer-readable medium comprising program instructions, executable by processing circuitry, to cause the processing circuitry to use a dynamic simulator 1504 to build a process model of the gas-oil separation plant, wherein the process model includes at least the plurality of separators, the stabilizer and the storage tank, simulate the crude oil recovery of the GOSP under varying operating pressures of at least one separator of the plurality of separators for different ambient temperatures surrounding the stabilizer to generate a simulated stabilized crude oil recovery dataset, normalize, by a normalization unit of the computing unit (see FIG. 4, 6, also 1506, FIG. 15A), the simulated stabilized crude oil recovery dataset, train an artificial intelligence unit with a first portion of the normalized stabilized crude oil recovery dataset to generate a trained artificial intelligence model; input to the trained artificial intelligence model a second portion of the normalized stabilized crude oil recovery dataset; predict the crude oil recovery for each separator pressure at each ambient temperature; determine, by an optimization unit of the computing unit, the pressure which yields maximum stabilized crude oil recovery for each ambient temperature; and adjust, by the computing unit, the operating pressures of the plurality of separators of the GOSP to compensate for ambient temperature conditions.

(14) The system of (13) further comprising wherein the artificial intelligence unit includes an artificial neural network (ANN), wherein the computing unit is further configured to train the ANN with the first portion of the normalized stabilized crude oil recovery dataset to generate a trained ANN; input the second portion of the normalized stabilized crude oil recovery dataset to the trained ANN; predict, by the trained ANN, a stabilized crude oil recovery at each separator pressure for each ambient temperature; and determine, by the optimization unit, the optimal pressure which maximizes stabilized crude oil recovery for each ambient temperature.

(15) The system of any one of (13) to (14), wherein the computing unit is further configured to: measure the separator pressures for each ambient temperature of the GOSP; measure an amount of stabilized crude oil recovered in the storage tank at each separator pressure and ambient temperature over a time period; apply current datasets including measured separator pressures, ambient temperatures and amounts of stabilized crude oil recovered in the storage tank of the GOSP to the trained ANN to predict the stabilized crude oil recovery at each separator pressure for each ambient temperature; determine, by a statistical analysis unit of the computing system, a statistical distance of the current stabilized crude oil recovery from the predicted maximum stabilized crude oil recovery; determine, by the optimization unit of the computing unit, the optimal pressure which maximizes stabilized crude oil recovery for each ambient temperature; and adjust the operating pressures of the plurality of separators of the gas-oil separation plant to compensate for current ambient temperature conditions.

(16) The system of any one of (13) to (15), wherein the computing unit is further configured to test the accuracy of the trained ANN by inputting a third portion of the normalized stabilized crude oil recovery dataset to generate a testing output dataset, perform a statistical analysis between the trained output dataset and the testing output dataset by calculating a coefficient of determination, $R^2$, between the predicted stabilized crude oil recovery and the testing stabilized crude oil recovery for each pressure and each ambient temperature, and perform, by the statistical analysis unit, a statistical analysis between the trained output dataset and the testing output dataset by calculating a mean squared error (MSE), between the predicted stabilized crude oil recovery and the current stabilized crude oil recovery for each pressure and each ambient temperature.

(17) The system of (13), wherein the artificial intelligence unit includes a support vector machine (SVM), wherein the computing unit is further configured to train the SVM with the first portion of the normalized stabilized crude oil recovery dataset to generate a trained SVM; input the second portion of the normalized stabilized crude oil recovery dataset to the trained SVM; predict, by the trained SVM, a stabilized crude oil recovery at each separator pressure for each ambient temperature; and determine, by the optimization unit, the optimal pressure which maximizes stabilized crude oil recovery for each ambient temperature.

(18) The system of (17), wherein the computing unit is further configured to measure the separator pressures for each ambient temperature of the GOSP, measure an amount of stabilized crude oil recovered in the storage tank of the GOSP at each separator pressure and ambient temperature over a time period, apply current datasets including measured separator pressures, ambient temperatures and amounts of stabilized crude oil recovered in the storage tank of the GOSP to the trained SVM to predict the stabilized crude oil recovery at each separator pressure for each ambient temperature; determine, by the statistical analysis unit, a statistical distance of the current stabilized crude oil recovery from the predicted stabilized crude oil recovery, determine, by the optimization unit of the computing unit, the optimal pressure which maximizes stabilized crude oil recovery for each ambient temperature; and adjust the operating pressures of the plurality of separators of the gas-oil separation plant to compensate for current ambient temperature conditions.

(19) The system of any one of (17) to (18), wherein the computing unit is further configured to test the accuracy of the trained SVM by inputting a third portion of the normalized stabilized crude oil recovery dataset to generate a testing output dataset, perform, by the statistical analysis unit, a statistical analysis between the trained output dataset and the testing output dataset by calculating a coefficient of determination, $R^2$, between the predicted stabilized crude oil recovery and the testing stabilized crude oil recovery for each pressure and each ambient temperature and perform a statistical analysis between the trained output dataset and the testing output dataset by calculating a mean squared error (MSE), between the predicted stabilized crude oil recovery and the current stabilized crude oil recovery for each pressure and each ambient temperature.

(20) A non-transitory computer readable medium having instructions stored therein that, when executed by one or more processors, cause the one or more processors to perform a method for maximizing stabilized crude oil recovery in a gas-oil separation plant (GOSP) 300, comprising building, by a computing unit 1500 including a dynamic simulator 1504, a process model of the gas-oil separation plant, wherein the model includes at least a plurality of separators (312, 314, 316), a stabilizer 302 and a storage tank 330 of the GOSP, simulating the crude oil recovery of the GOSP under varying operating pressures of at least one separator of a plurality of separators for different ambient temperatures surrounding the stabilizer to generate a simulated stabilized crude oil recovery dataset, normalizing (see FIG. 4, 6, also 1506, FIG. 15A), by the computing unit, the simulated stabilized crude oil recovery dataset to generate a normalized stabilized crude oil recovery dataset; training, by the computing unit, an artificial intelligence unit with a first portion of the normalized stabilized crude oil recovery dataset to generate a trained artificial intelligence model; inputting to the trained artificial intelligence model a second portion of the normalized stabilized crude oil recovery dataset; predicting the crude oil recovery for each separator pressure at each ambient temperature; determining, by the computing unit, a pressure which maximizes stabilized crude oil recovery for each ambient temperature; and adjusting, by the computing unit, the operating pressures of the plurality of separators of the GOSP to compensate for ambient temperature conditions.

Figure 15B:
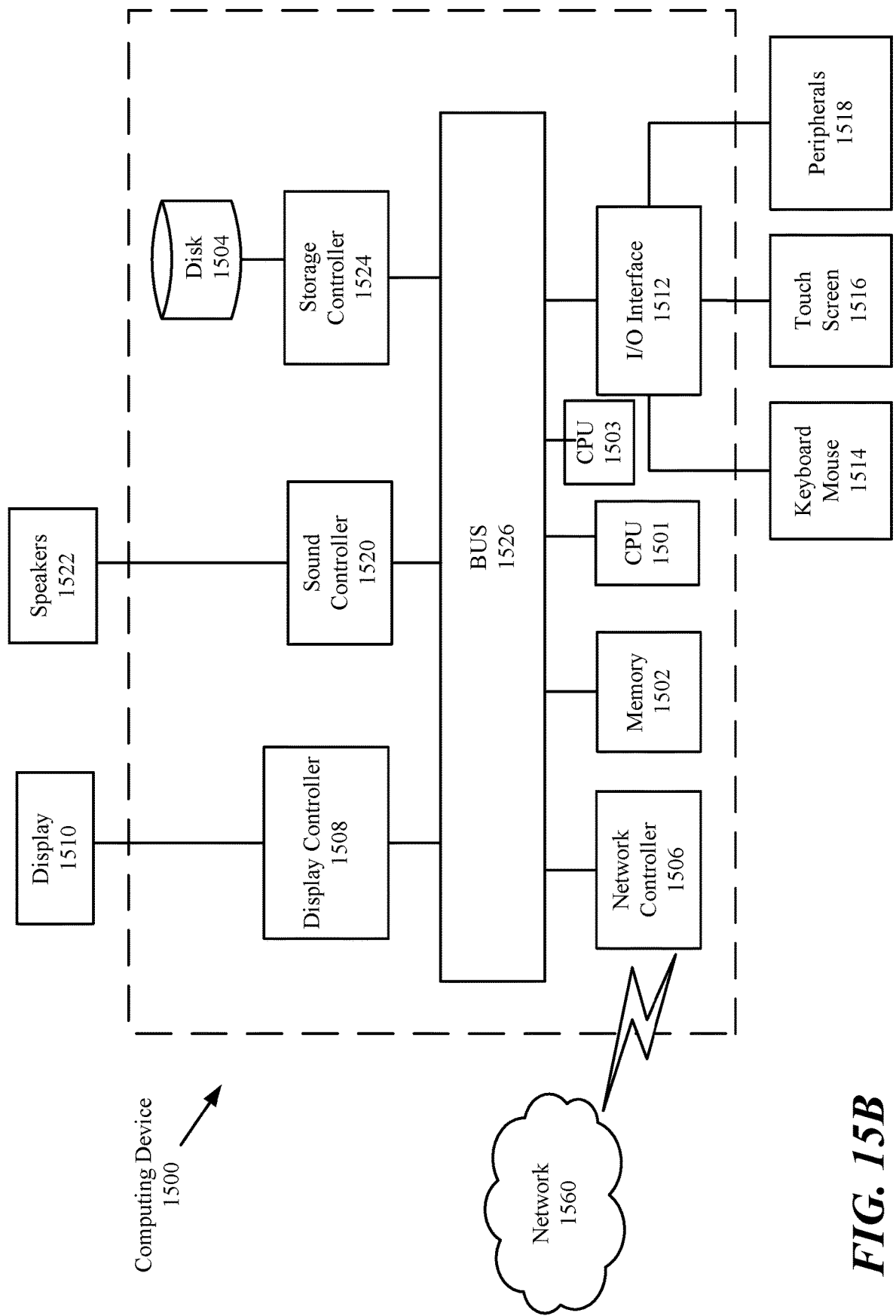
FIG. 15B is an illustration of a non-limiting example of details of computing hardware used in the computing system of FIG. 15A, according to certain embodiments.

Next, further details of the hardware description of the computing environment of FIG. 15A according to exemplary embodiments is described with reference to FIG. 15B. In FIG. 15B, the computing device 1500 described is representative of the computing unit 1500 of FIG. 15A. The computing device includes a CPU 1501 which performs the processes described above/below. The process data and instructions may be stored in memory 1502. These processes and instructions may also be stored on a storage medium disk 1504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1501, 1503 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1501 or CPU 1503 may be a Xenon or Core processor from Intel of America or an Opteron processor from AMD of America, or may be other processor types that would be recognized by one of ordinary skill in the art. Alternatively, the CPU 1501, 1503 may be implemented on an FPGA, ASIC, PLD or using discrete logic circuits, as one of ordinary skill in the art would recognize. Further, CPU 1501, 1503 may be implemented as multiple processors cooperatively working in parallel to perform the instructions of the inventive processes described above.

The computing device in FIG. 15B also includes a network controller 1506, such as an Intel Ethernet PRO network interface card from Intel Corporation of America, for interfacing with network 1560. As can be appreciated, the network 1560 can be a public network, such as the Internet, or a private network such as an LAN or WAN network, or any combination thereof and can also include PSTN or ISDN sub-networks. The network 1560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the computing device such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the computing device. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 16.

Figure 16:
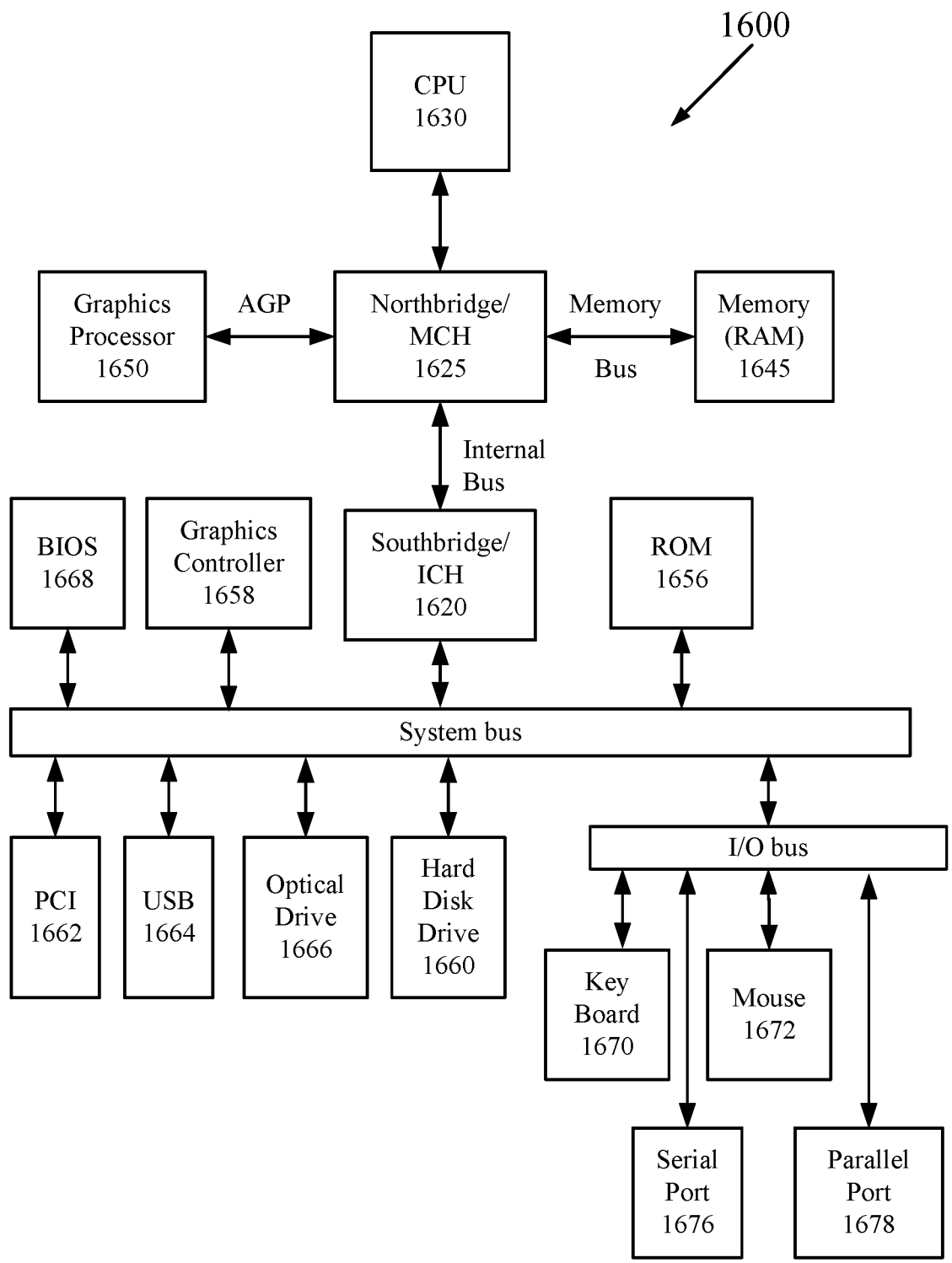
FIG. 16 is an exemplary schematic diagram of a data processing system used within the computing system, according to certain embodiments.

FIG. 16 shows a schematic diagram of a data processing system, according to certain embodiments, for performing the functions of the exemplary embodiments. The data processing system is an example of a computer in which code or instructions implementing the processes of the illustrative embodiments may be located.

In FIG. 16, data processing system 1600 employs a hub architecture including a north bridge and memory controller hub (NB/MCH) 1625 and a south bridge and input/output (I/O) controller hub (SB/ICH) 1620. The central processing unit (CPU) 1630 is connected to NB/MCH 1625. The NB/MCH 1625 also connects to the memory 1645 via a memory bus, and connects to the graphics processor 1650 via an accelerated graphics port (AGP). The NB/MCH 1625 also connects to the SB/ICH 1620 via an internal bus (e.g., a unified media interface or a direct media interface). The CPU Processing unit 1630 may contain one or more processors and even may be implemented using one or more heterogeneous processor systems.

Figure 17:
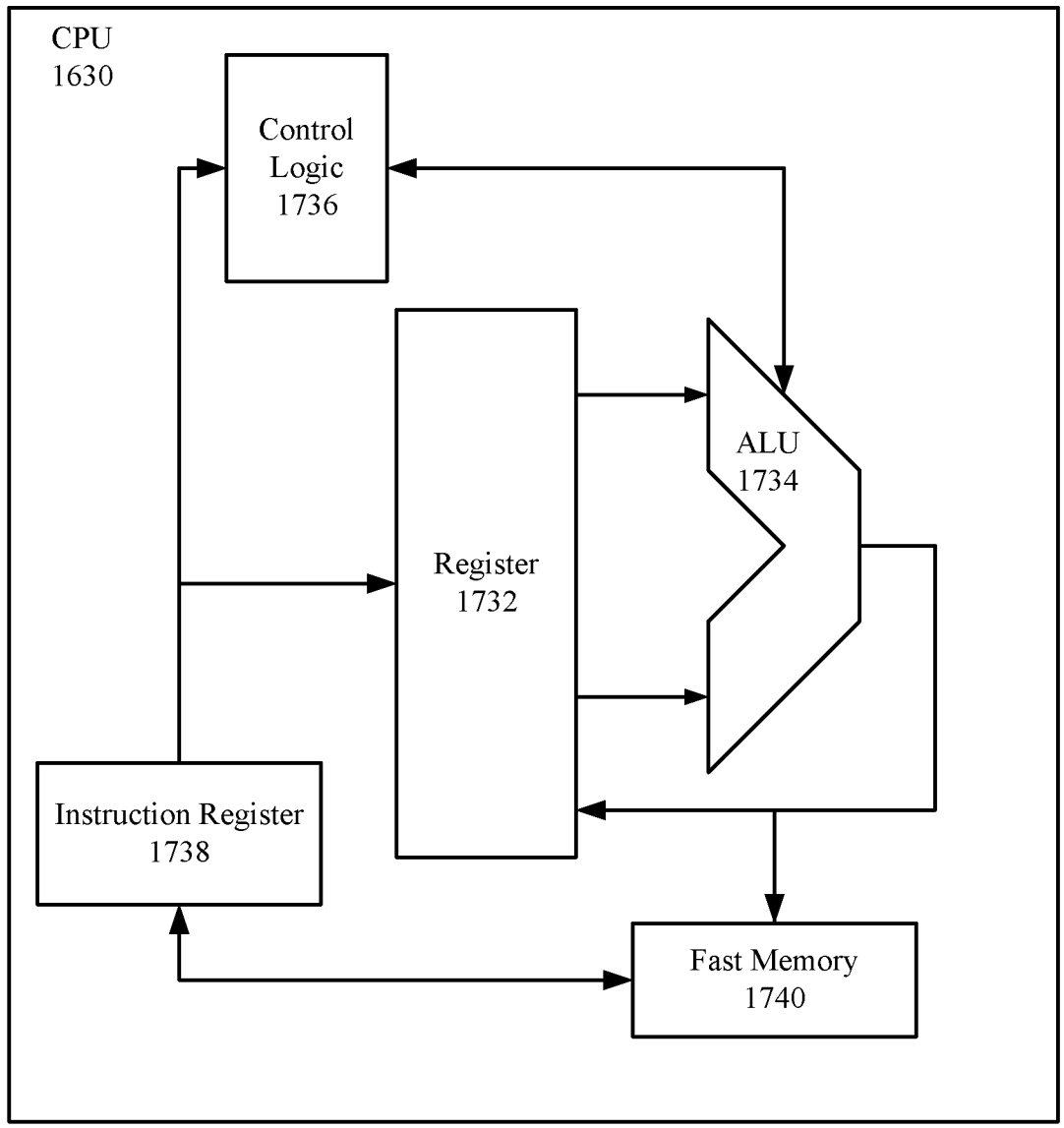
FIG. 17 is an exemplary schematic diagram of a processor used with the computing system, according to certain embodiments.

For example, FIG. 17 shows one implementation of CPU 1630. In one implementation, the instruction register 1738 retrieves instructions from the fast memory 1740. At least part of these instructions are fetched from the instruction register 1738 by the control logic 1736 and interpreted according to the instruction set architecture of the CPU 1630. Part of the instructions can also be directed to the register 1732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1734 that loads values from the register 1732 and performs logical and mathematical operations on the loaded values according to the instructions. The results from these operations can be feedback into the register and/or stored in the fast memory 1740. According to certain implementations, the instruction set architecture of the CPU 1630 can use a reduced instruction set architecture, a complex instruction set architecture, a vector processor architecture, a very large instruction word architecture. Furthermore, the CPU 1630 can be based on the Von Neuman model or the Harvard model. The CPU 1630 can be a digital signal processor, an FPGA, an ASIC, a PLA, a PLD, or a CPLD. Further, the CPU 1630 can be an x86 processor by Intel or by AMD; an ARM processor, a Power architecture processor by, e.g., IBM; a SPARC architecture processor by Sun Microsystems or by Oracle, or other known CPU architecture.

Referring again to FIG. 16, the data processing system 1600 can include that the SB/ICH 1620 is coupled through a system bus to an I/O Bus, a read only memory (ROM) 1656, universal serial bus (USB) port 1664, a flash binary input/output system (BIOS) 1668, and a graphics controller 1658. PCI/PCIe devices can also be coupled to SB/ICH 1688 through a PCI bus 1662.

The PCI devices may include, for example, Ethernet adapters, add-in cards, and PC cards for notebook computers. The Hard disk drive 1660 and CD-ROM 1666 can use, for example, an integrated drive electronics (IDE) or serial advanced technology attachment (SATA) interface. In one implementation the I/O bus can include a super I/O (SIO) device.

Further, the hard disk drive (HDD) 1660 and optical drive 1666 can also be coupled to the SB/ICH 1620 through a system bus. In one implementation, a keyboard 1670, a mouse 1672, a parallel port 1678, and a serial port 1676 can be connected to the system bus through the I/O bus. Other peripherals and devices that can be connected to the SB/ICH 1620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 18:
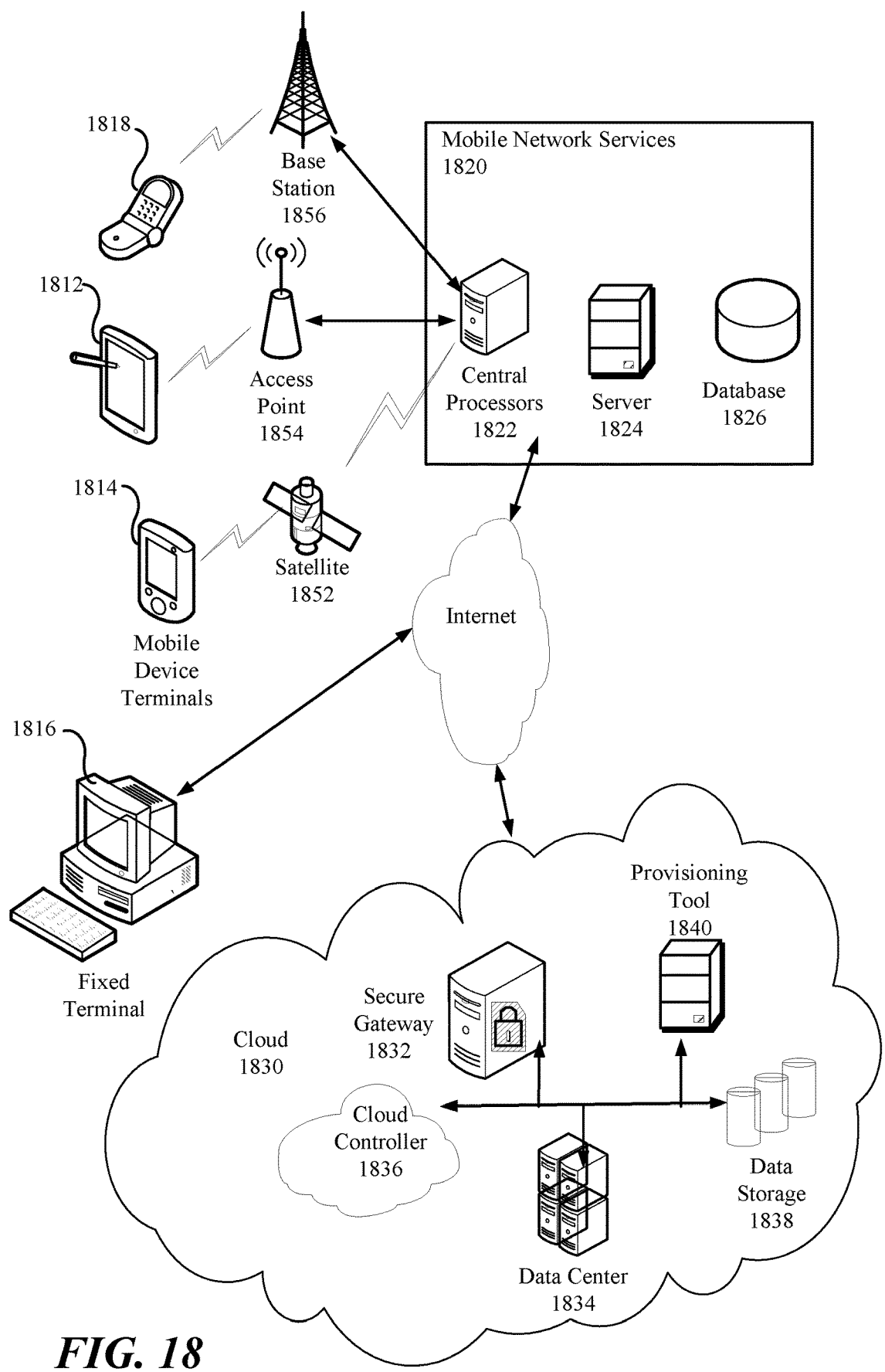
FIG. 18 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 18, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for maximizing stabilized crude oil recovery in a gas-oil separation plant (GOSP), comprising:
building, by a computing unit including a dynamic simulator, a process model of the gas-oil separation plant, wherein the process model includes at least a plurality of separators, a stabilizer and a storage tank of the GOSP;
simulating the stabilized crude oil recovery of the GOSP under varying operating pressures of at least one separator of the plurality of separators for different ambient temperatures surrounding the stabilizer to generate a simulated stabilized crude oil recovery dataset;
normalizing, by the computing unit, the simulated stabilized crude oil recovery dataset to generate a normalized stabilized crude oil recovery dataset;
training, by the computing unit, an artificial intelligence unit with a first portion of the normalized stabilized crude oil recovery dataset to generate a trained artificial intelligence model;
inputting to the trained artificial intelligence model a second portion of the normalized stabilized crude oil recovery dataset;
predicting the stabilized crude oil recovery for each separator pressure at each ambient temperature;
determining, by the computing unit, an optimal pressure which maximizes stabilized crude oil recovery for each ambient temperature; and
adjusting, by the computing unit, the operating pressures of the plurality of separators of the GOSP to compensate for ambient temperature conditions.

2. The method of claim 1, wherein the artificial intelligence unit includes an artificial neural network (ANN), including:
training, by the computing unit, the artificial neural network (ANN) with the first portion of the normalized stabilized crude oil recovery dataset to generate a trained ANN;
inputting the second portion of the normalized stabilized crude oil recovery dataset to the trained ANN;
predicting, by the trained ANN, a stabilized crude oil recovery value at each separator pressure for each ambient temperature; and
determining, by the computing unit, the optimal pressure for each ambient temperature.

3. The method of claim 2, further comprising:
measuring the separator pressures for each ambient temperature of the GOSP;
measuring an amount of stabilized crude oil recovered in the storage tank at each separator pressure and ambient temperature over a time period;
applying current datasets including measured separator pressures, ambient temperatures and amounts of stabilized crude oil recovered in the storage tank of the GOSP to the trained ANN to predict the stabilized crude oil recovery at each separator pressure for each ambient temperature;
determining a statistical distance of the current stabilized crude oil recovery from the predicted stabilized crude oil recovery;
determining, by the computing unit, the optimal pressure which maximizes stabilized crude oil recovery for each ambient temperature; and
adjusting the operating pressures of the plurality of separators of the gas-oil separation plant to compensate for current ambient temperature conditions.

4. The method of claim 3, further comprising:
testing the accuracy of the trained ANN by inputting a third portion of the normalized stabilized crude oil recovery dataset to generate a testing output dataset; and performing a statistical analysis between the trained output dataset and the testing output dataset by calculating a coefficient of determination, $R^2$, between the predicted stabilized crude oil recovery and the testing stabilized crude oil recovery for each pressure and each ambient temperature.

5. The method of claim 4, further comprising:
determining the statistical distance by calculating a mean squared error (MSE), between the predicted stabilized crude oil recovery and the current stabilized crude oil recovery for each pressure and each ambient temperature.

6. The method of claim 1, wherein the artificial intelligence unit includes a support vector machine (SVM), further comprising:
training, by the computing unit, the SVM with the first portion of the normalized stabilized crude oil recovery dataset to generate a trained SVM;
inputting the second portion of the normalized stabilized crude oil recovery dataset to the trained SVM;
predicting, by the trained SVM, a stabilized crude oil recovery at each separator pressure for each ambient temperature; and
and determining, by the computing unit, the optimal pressure which maximizes stabilized crude oil recovery for each ambient temperature.

7. The method of claim 6, further comprising:
measuring the separator pressures for each ambient temperature of the GOSP;
measuring an amount of stabilized crude oil recovered in the storage tank of the GOSP at each separator pressure and ambient temperature over a time period;
applying current datasets including measured separator pressures, ambient temperatures and amounts of stabilized crude oil recovered in the storage tank of the GOSP to the trained SVM to predict the stabilized crude oil recovery at each separator pressure for each ambient temperature;
determining a statistical distance of the current stabilized crude oil recovery from the predicted stabilized crude oil recovery;
determining, by the computing unit, the optimal pressure which maximizes stabilized crude oil recovery for each ambient temperature; and
adjusting the operating pressures of the plurality of separators of the gas-oil separation plant to compensate for current ambient temperature conditions.

8. The method of claim 7, further comprising:
testing the accuracy of the trained SVM by inputting a third portion of the normalized stabilized crude oil recovery dataset to generate a testing output dataset; and
performing a statistical analysis between the trained output dataset and the testing output dataset by calculating a coefficient of determination, $R^2$, between the predicted stabilized crude oil recovery and the testing stabilized crude oil recovery for each pressure and each ambient temperature.

9. The method of claim 8, further comprising:
performing a statistical analysis between the trained output dataset and the testing output dataset by calculating a mean squared error (MSE), between the predicted stabilized crude oil recovery and the current stabilized crude oil recovery for each pressure and each ambient temperature.

10. The method of claim 1, further comprising:
measuring the ambient temperature surrounding the separators;
measuring the operating pressure of a low pressure production trap (LPPT) separator; and
adjusting the operating pressure of the LPPT to the operating pressure which maximizes stabilized crude oil recovery for the measured ambient temperature.

11. The method of claim 10, further comprising:
increasing the operating pressure of the LPPT by at least 50% from a base operating pressure during months of the year which are colder than an average yearly temperature; and
increasing the operating pressure of the LPPT by at least 70% from a base operating pressure during months of the year which are warmer than an average yearly temperature.

12. The method of claim 1, wherein the artificial intelligence unit includes any one of an artificial neural network (ANN), a support vector machine (SVM), a functional network (FN), a decision tree (DT) and fuzzy logic (FL).

13. A system for maximizing stabilized crude oil recovery, comprising:
a gas-oil separation plant (GOSP) having components including:
a plurality of separators;
a stabilizer;
a storage tank configured for holding stabilized crude oil;
a computing unit operatively connected to the components, the computing unit including a computer-readable medium comprising program instructions, executable by processing circuitry, to cause the processing circuitry to:
use a dynamic simulator to build a process model of the gas-oil separation plant, wherein the process model includes at least the plurality of separators, the stabilizer and the storage tank;
simulate the crude oil recovery of the GOSP under varying operating pressures of at least one separator of the plurality of separators for different ambient temperatures surrounding the stabilizer to generate a simulated stabilized crude oil recovery dataset;
normalize, by a normalization unit of the computing unit, the simulated stabilized crude oil recovery dataset to generate a normalized stabilized crude oil recovery dataset;
train an artificial intelligence unit with a first portion of the normalized stabilized crude oil recovery dataset to generate a trained artificial intelligence model;
input to the trained artificial intelligence model a second portion of the normalized stabilized crude oil recovery dataset;
predict the crude oil recovery for each separator pressure at each ambient temperature;
determine, by an optimization unit of the computing unit, the pressure which yields maximum stabilized crude oil recovery for each ambient temperature; and
adjust, by the computing unit, the operating pressures of the plurality of separators of the GOSP to compensate for ambient temperature conditions.

14. The system of claim 13, further comprising:
wherein the artificial intelligence unit includes an artificial neural network (ANN);
wherein the computing unit is further configured to:
train the ANN with the first portion of the normalized stabilized crude oil recovery dataset to generate a trained ANN;

input the second portion of the normalized stabilized crude oil recovery dataset to the trained ANN;

predict, by the trained ANN, a stabilized crude oil recovery at each separator pressure for each ambient temperature; and determine, by the optimization unit, the optimal pressure which maximizes stabilized crude oil recovery for each ambient temperature.

15. The system of claim 14, wherein the computing unit is further configured to:

measure the separator pressures for each ambient temperature of the GOSP;

measure an amount of stabilized crude oil recovered in the storage tank at each separator pressure and ambient temperature over a time period;

apply current datasets including measured separator pressures, ambient temperatures and amounts of stabilized crude oil recovered in the storage tank of the GOSP to the trained ANN to predict the stabilized crude oil recovery at each separator pressure for each ambient temperature;

determine, by a statistical analysis unit of the computing system, a statistical distance of the current stabilized crude oil recovery from the predicted stabilized crude oil recovery;

determine, by the optimization unit of the computing unit, the optimal pressure which maximizes stabilized crude oil recovery for each ambient temperature; and adjust the operating pressures of the plurality of separators of the gas-oil separation plant to compensate for current ambient temperature conditions.

16. The system of claim 15, wherein the computing unit is further configured to:

test the accuracy of the trained ANN by inputting a third portion of the normalized stabilized crude oil recovery dataset to generate a testing output dataset; and perform a statistical analysis between the trained output dataset and the testing output dataset by calculating a coefficient of determination, $R^2$, between the predicted stabilized crude oil recovery and the testing stabilized crude oil recovery for each pressure and each ambient temperature; and perform, by the statistical analysis unit, a statistical analysis between the trained output dataset and the testing output dataset by calculating a mean squared error (MSE), between the predicted stabilized crude oil recovery and the current stabilized crude oil recovery for each pressure and each ambient temperature.

17. The system of claim 13, wherein the artificial intelligence unit includes a source vector machine (SVM);

wherein the computing unit is configured to:

train the SVM with the first portion of the normalized stabilized crude oil recovery dataset to generate a trained SVM;

input the second portion of the normalized stabilized crude oil recovery dataset to the trained SVM;

predict, by the trained SVM, a stabilized crude oil recovery at each separator pressure for each ambient temperature; and determine, by the optimization unit, the optimal pressure which maximizes stabilized crude oil recovery for each ambient temperature.

18. The system of claim 17, wherein the computing unit is further configured to:

measure the separator pressures for each ambient temperature of the GOSP;

measure an amount of stabilized crude oil recovered in the storage tank at each separator pressure and ambient temperature over a time period;

apply current datasets including measured separator pressures, ambient temperatures and amounts of stabilized crude oil recovered in the storage tank of the GOSP to the trained SVM to predict the stabilized crude oil recovery at each separator pressure for each ambient temperature;

determine, by a statistical analysis unit, a statistical distance of the current stabilized crude oil recovery from the predicted stabilized crude oil recovery;

determine, by the optimization unit of the computing unit, the optimal pressure which maximizes stabilized crude oil recovery for each ambient temperature; and adjust the operating pressures of the plurality of separators of the gas-oil separation plant to compensate for current ambient temperature conditions.

19. The system of claim 18, wherein the computing unit is further configured to:

test the accuracy of the trained SVM by inputting a third portion of the normalized stabilized crude oil recovery dataset to generate a testing output dataset;

perform, by the statistical analysis unit, a statistical analysis between the trained output dataset and the testing output dataset by calculating a coefficient of determination, $R^2$, between the predicted stabilized crude oil recovery and the testing stabilized crude oil recovery for each pressure and each ambient temperature; and perform a statistical analysis between the trained output dataset and the testing output dataset by calculating a mean squared error (MSE), between the predicted stabilized crude oil recovery and the current stabilized crude oil recovery for each pressure and each ambient temperature.

20. A non-transitory computer readable medium having instructions stored therein that, when executed by one or more processors, cause the one or more processors to perform a method for maximizing stabilized crude oil recovery in a gas-oil separation plant (GOSP), comprising:

building, by a computing unit including a dynamic simulator, a process model of the gas-oil separation plant, wherein the process model includes at least a plurality of separators, a stabilizer and a storage tank of the GOSP;

simulating the stabilized crude oil recovery of the GOSP under varying operating pressures of at least one separator of the plurality of separators for different ambient temperatures surrounding the stabilizer to generate a simulated stabilized crude oil recovery dataset;

normalizing, by the computing unit, the simulated stabilized crude oil recovery dataset to generate a normalized stabilized crude oil recovery dataset;

training, by the computing unit, an artificial intelligence unit with a first portion of the normalized stabilized crude oil recovery dataset to generate a trained artificial intelligence model;

inputting to the trained artificial intelligence model a second portion of the normalized stabilized crude oil recovery dataset;

predicting the stabilized crude oil recovery for each separator pressure at each ambient temperature;

determining, by the computing unit, a pressure which maximizes stabilized crude oil recovery for each ambient temperature; and adjusting, by the computing unit, the operating pressures of the plurality of separators of the GOSP to compensate for ambient temperature conditions.

\* \* \* \* \*